US012729820B2

(12) United States Patent
Onishi et al.

(10) Patent No.: US 12,729,820 B2
(45) Date of Patent: Sep. 8, 2026

(54) LIGHTING SYSTEM

(71) Applicant: Panasonic Intellectual Property Management Co., Ltd., Osaka (JP)

(72) Inventors: Itaru Onishi, Osaka (JP); Naoki Tomoda, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/137,553

(22) PCT Filed: Nov. 27, 2023

(86) PCT No.: PCT/JP2023/042340
§ 371 (c)(1),
(2) Date: Jun. 10, 2025

(87) PCT Pub. No.: WO2024/142705
PCT Pub. Date: Jul. 4, 2024

(65) Prior Publication Data

US 2026/0202024 A1 Jul. 16, 2026

(30) Foreign Application Priority Data

Dec. 27, 2022 (JP) ................................ 2022-210789

(51) Int. Cl.
*F21S 8/04* (2006.01)
*F21V 5/00* (2018.01)
(Continued)

(52) U.S. Cl.
CPC ................ *F21S 8/04* (2013.01); *F21V 5/007* (2013.01); *F21V 5/046* (2013.01); *F21V 23/009* (2013.01); *F21W 2131/101* (2013.01)

(58) Field of Classification Search
CPC .......... F21S 8/00–046; F21V 5/00–048; F21V 23/00–009; F21W 2131/101
See application file for complete search history.

(56) References Cited

U.S. PATENT DOCUMENTS 4,572,613 A * 2/1986 Mori ........................ F21S 11/00 359/597

FOREIGN PATENT DOCUMENTS

JP 2002-184204 A 6/2002
JP 2014-095627 A 5/2014
(Continued)

OTHER PUBLICATIONS

International Search Report dated Jan. 30, 2024 issued in International Patent Application No. PCT/JP2023/042340, with English translation.
(Continued)

*Primary Examiner* — Jason M Han
(74) *Attorney, Agent, or Firm* — Rimon P.C.

(57) ABSTRACT

A lighting system includes a housing, a light source, an optical member, and a shooting unit. The housing is mounted on an inner wall surface of a tunnel provided along a road. The light source is provided for the housing to emit lighting light. The optical member is provided for the housing to receive the lighting light incident thereon. The shooting unit is provided for the housing. The optical member causes a first bundle of rays to emerge toward the road and also causes a second bundle of rays to emerge toward the inner wall surface. The shooting unit shoots at least a part of an irradiation range where the inner wall surface is irradiated with the second bundle of rays.

18 Claims, 26 Drawing Sheets

(51) Int. Cl.

| | |
|---|---|
| ***F21V 5/04*** | (2006.01) |
| ***F21V 23/00*** | (2015.01) |
| ***F21W 131/101*** | (2006.01) |

(56) References Cited

FOREIGN PATENT DOCUMENTS

| | | | |
|---|---|---|---|
| JP | 2015-190838 | A | 11/2015 |
| JP | 2016-126835 | A | 7/2016 |
| JP | 2022-027232 | A | 2/2022 |
| WO | 2022/181091 | A1 | 9/2022 |

OTHER PUBLICATIONS

Extended European Search Report dated Jan. 20, 2026 issued in the corresponding European Patent Application No. 23911486.1.

* cited by examiner

LIGHTING SYSTEM

CROSS-REFERENCE OF RELATED APPLICATIONS

This application is the U.S. National Phase under 35 U.S.C. § 371 of International Patent Application No. PCT/JP2023/042340, filed on Nov. 27, 2023, which in turn claims the benefit of Japanese Patent Application No. 2022-210789, filed on Dec. 27, 2022, the entire disclosures of which Applications are incorporated by reference herein.

TECHNICAL FIELD

The present disclosure relates to a lighting system.

BACKGROUND ART

In the known art, the inner wall surface of a tunnel is shot to inspect the conditions of the inner wall surface of the tunnel (e.g., inspect the inner wall for any fractures, cracks, or rust). For example, according to Patent Literature 1, a service vehicle is equipped with a lighting means and a shooting means to make the lighting means irradiate the inner wall surface of a tunnel with lighting light and make the shooting means shoot the inner wall surface of the tunnel with the service vehicle driven inside the tunnel.

To shoot the inner wall surface of a tunnel using a service vehicle, however, the service vehicle needs to be driven slowly inside the tunnel while regulating the passage of other vehicles. Thus, shooting should be performed during hours of the day when there is relatively light traffic (e.g., in the nighttime) to avoid causing a traffic jam. That is why it is difficult to shoot, using a service vehicle, the inner wall surface of a tunnel during hours of the day when there is relatively heavy traffic (e.g., in the daytime).

In addition, to improve the accuracy of inspection, the service vehicle should be driven, and the inner wall surface should be shot, more frequently, thus requiring at least one service vehicle and at least one worker.

As can be seen, various restrictions are imposed when it comes to shooting the inner wall surface of a tunnel using a service vehicle for inspection purposes. In other words, it is difficult to shoot the inner wall surface of a tunnel easily.

CITATION LIST

Patent Literature

Patent Literature 1: JP 2014-95627 A

SUMMARY OF INVENTION

An object of the present disclosure is to provide a lighting system that allows the inner wall surface of a tunnel to be shot easily.

A lighting system according to an aspect of the present disclosure includes a housing, a light source, an optical member, and a shooting unit. The housing is mounted on an inner wall surface of a tunnel provided along a road. The light source is provided for the housing to emit lighting light. The optical member is provided for the housing to receive the lighting light incident thereon. The shooting unit is provided for the housing. The optical member causes a first bundle of rays to emerge toward the road and also causes a second bundle of rays to emerge toward the inner wall surface. The shooting unit generates data about a captured image by shooting at least a part of an irradiation range where the inner wall surface is irradiated with the second bundle of rays.

DESCRIPTION OF EMBODIMENTS

An exemplary embodiment to be described below generally relates to a lighting system. More particularly, the present disclosure relates to a lighting system for use inside at least tunnels.

Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure.

The lighting system according to this embodiment is supposed to be used mainly inside tunnels. However, this is only an example and should not be construed as limiting. Alternatively, the lighting system according to this embodiment may also be used in any other structures such as snow fences and snow protection walls.

The lighting system according to this embodiment not only provides lighting to help the traffic flow smoothly, which is one of the basic functions to be performed by lighting fixtures installed inside a tunnel. In addition, even if external light cannot reach the inner wall surface of the tunnel, the lighting system according to this embodiment also lights up the inner wall surface of the tunnel in the dark to increase the illuminance on the inner wall surface to a level high enough for a shooting unit such as a camera to shoot it clearly. Furthermore, the lighting system according to this embodiment may also be used as a light source which is available at any time of the day.

Embodiments will now be described with reference to the accompanying drawings.

(1) EMBODIMENTS

(1.1) Overview of Lighting System

Figure 1:
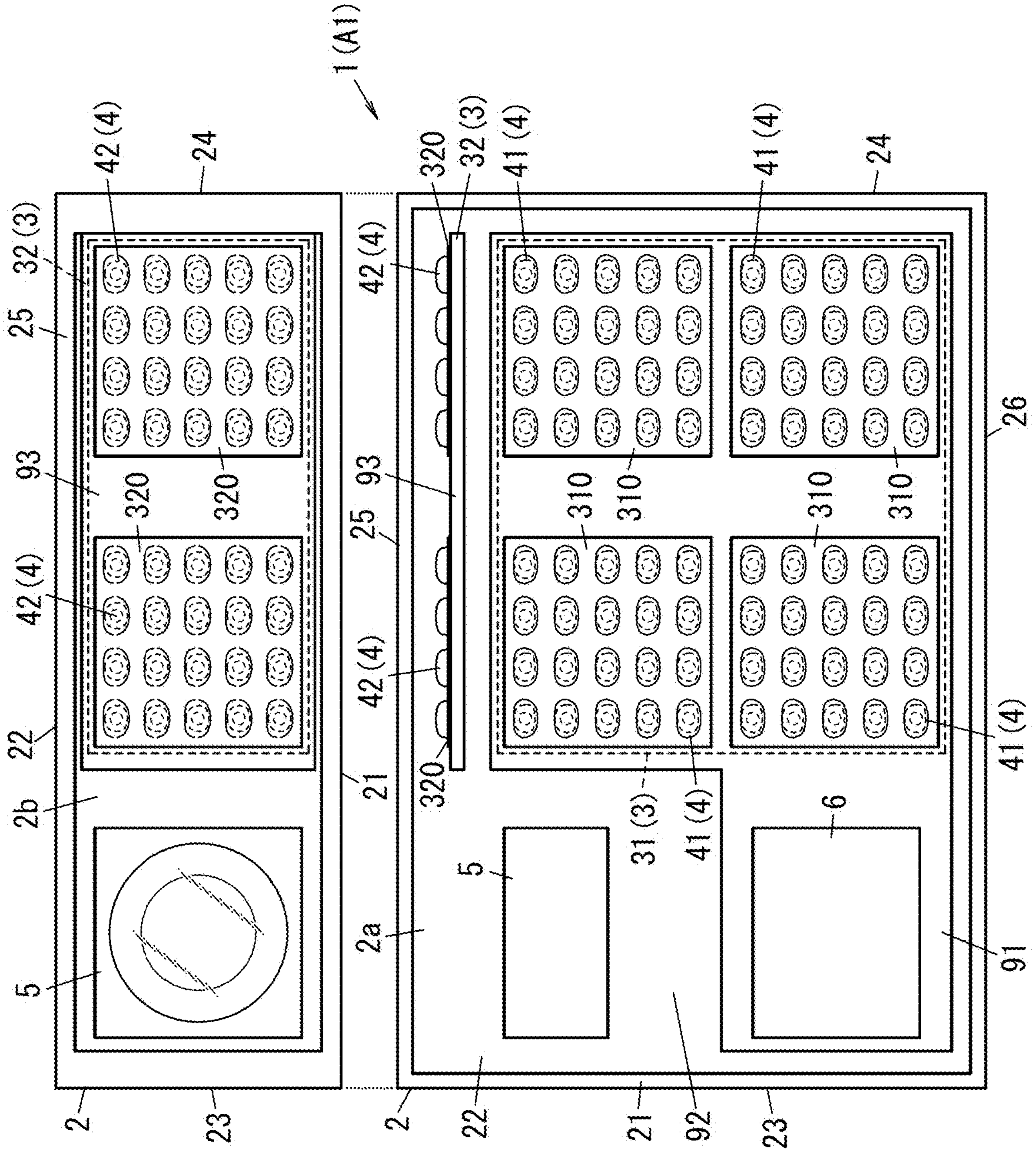
FIG. 1 is a front view and a top view illustrating a lighting fixture corresponding to a lighting system according to an exemplary embodiment.

FIG. 1 illustrates a lighting fixture 1 as an exemplary lighting system A1 according to an exemplary embodiment. That is to say, the lighting system A1 is implemented as the lighting fixture 1.

The lighting fixture 1 includes a housing 2, a light source 3, an optical member 4, and a shooting unit 5.

The housing 2 is mounted on the inner wall surface of a tunnel provided along a road. The light source 3 is provided for the housing 2 to emit lighting light. The optical member 4 is provided for the housing 2 to receive the lighting light incident thereon. The shooting unit 5 is provided for the housing 2. The optical member 4 causes a first bundle of rays L1 to emerge toward the road and also causes a second bundle of rays L2 to emerge toward the inner wall surface. The shooting unit 5 generates data about a captured image by shooting at least a part of an irradiation range where the inner wall surface is irradiated with the second bundle of rays.

This lighting fixture 1 allows for shooting the inner wall surface of a tunnel even without using a service vehicle equipped with a lighting means and a shooting means. Thus, the lighting fixture 1 may shoot the inner wall surface of the tunnel easily. The lighting fixture 1 may shoot the inner wall surface of the tunnel, for example, even in the daytime when there is relatively heavy traffic, without causing a traffic jam. In addition, even if the inner wall surface needs to be shot more frequently to improve the accuracy of inspection, the lighting fixture 1 eliminates the need to secure any service vehicles or workers for that purpose.

(1.2) Details

Figure 10:
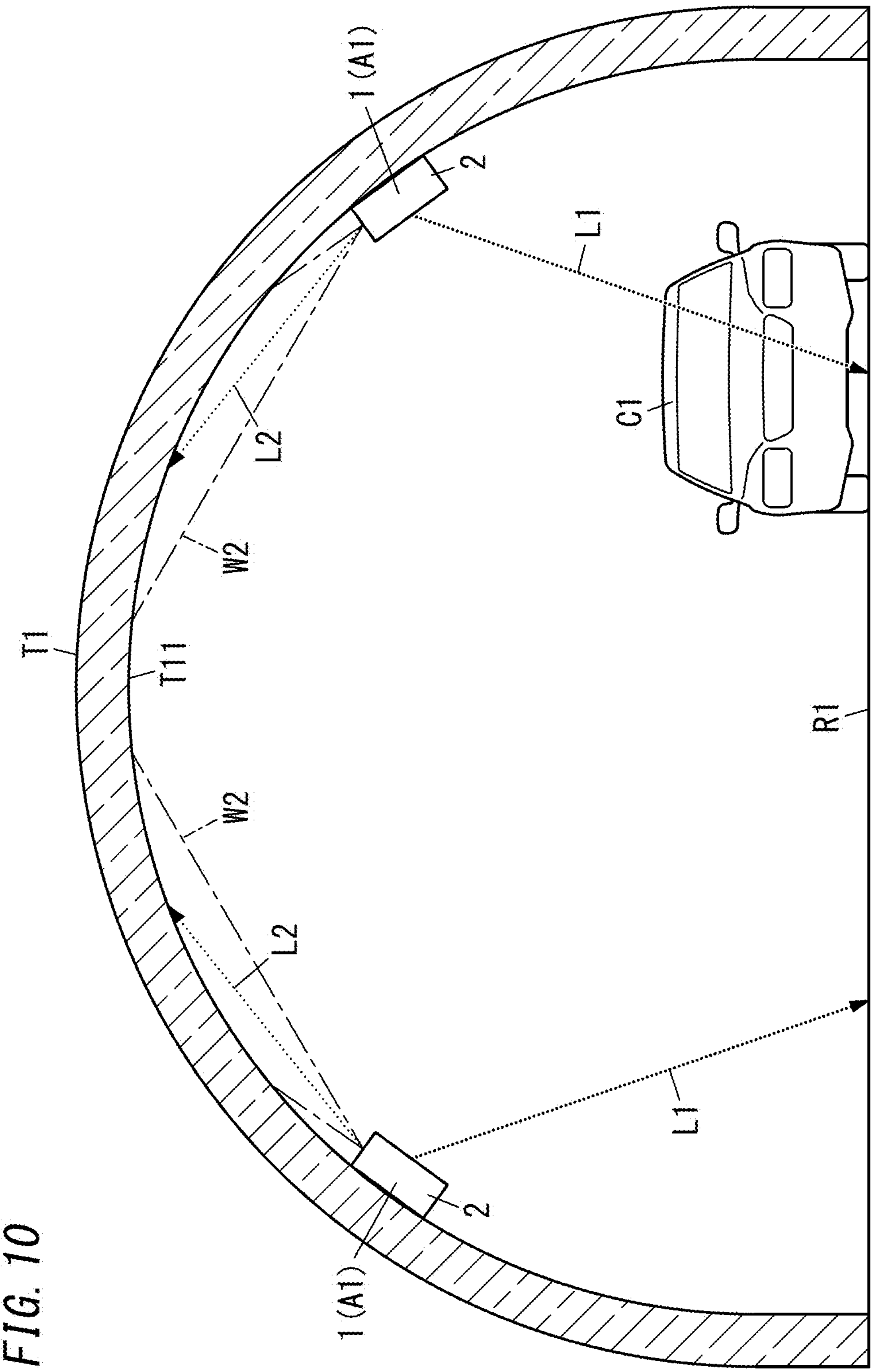
FIG. 10 illustrates the light distribution characteristics of the lighting fixture inside a tunnel.

A tunnel T1 is provided to extend along a road R1 as shown in FIG. 10. A vehicle C1 travels along the road R1. The lighting fixture 1 is mounted on the inner wall surface T11 of the tunnel T1. The lighting fixture 1 emits a first bundle of rays L1 toward the road R1 and also emits a second bundle of rays L2 toward the inner wall surface T11. Directing the first bundle of rays L1 toward the road R1 lights up the field of view of the driver who is driving the vehicle C1 along the road R1, thereby allowing the driver to drive his or her vehicle C1 more safely. On the other hand, directing the second bundle of rays L2 toward the inner wall surface T11 of the tunnel T1 may keep the inner wall surface T11 sufficiently bright. In addition, the shooting unit 5 shoots at least a part of an irradiation range W2 where the inner wall surface T11 is irradiated with the second bundle of rays L2. Note that in FIG. 10, the arrows indicating the first bundle of rays L1 and the second bundle of rays L2 represent the optical axes of the first bundle of rays L1 and the second bundle of rays L2, respectively. It should also be noted that the irradiation range of the first bundle of rays L1 is not shown in FIG. 10 to avoid making illustration on the drawing overly complicated.

As shown in FIG. 1, the lighting fixture 1 includes the housing 2, the light source 3, the optical member 4, and the shooting unit 5. In addition, the lighting fixture 1 further includes a circuit block 6.

(1.2.1) Housing

The housing 2 is a casing having the shape of a hollow rectangular parallelepiped and includes a front panel portion 21, a rear panel portion 22, a left panel portion 23, a right panel portion 24, the upper panel portion 25, and the lower panel portion 26, all of which have a rectangular shape as shown in FIG. 1. The front panel portion 21 and the rear panel portion 22 face each other in the upward/downward direction. The left panel portion 23 and the right panel portion 24 face each other in the rightward/leftward direction. The upper panel portion 25 and the lower panel portion 26 face each other in the upward/downward direction. The front panel portion 21 has a rectangular window 2*a*. The upper panel portion 25 has a rectangular window 2*b*. Optionally, these windows 2*a*, 2*b* may each be closed with a light-transmitting cover.

As shown in FIG. 10, the housing 2 is mounted on the inner wall surface T11 of the tunnel T1 around at the middle in the height direction (i.e., at the middle in the vertical direction). The inner wall surface T11 is a curved surface, of which a cross section has an arc-shape when viewed in the traveling direction of the vehicle C1. The housing 2 is mounted on the inner wall surface T11 such that the upper panel portion 25 protrudes toward the internal space of the tunnel T1 with respect to the lower panel portion 26. That is to say, the front panel portion 21 of the housing 2 faces obliquely downward with respect to the road R1. The upper panel portion 25 of the housing 2 extends in a direction substantially aligned with the inner wall surface T11 which extends in an arc shape above the upper panel portion 25.

(1.2.2) Light Source

The light source 3 includes a plurality of solid-state light-emitting elements. For example, the light source 3 may include an LED array in which a plurality of light-emitting diode (LED) elements, corresponding to the plurality of solid-state light-emitting elements, are connected together in series. The light source 3 does not have to include a plurality of LED elements as the solid-state light-emitting elements. Alternatively, the light source 3 may include any other type of solid-state light-emitting elements such as organic electroluminescent (OEL) elements or semiconductor laser diode (LD) elements. Also, the light source 3 does not have to include a plurality of solid-state light-emitting elements but may also include only one solid-state light-emitting element. In this embodiment, the plurality of solid-state light-emitting elements are electrically connected in series. However, this is only an example and should not be construed as limiting. Alternatively, the plurality of solid-state light-emitting elements may also be electrically connected in parallel with each other. Still alternatively, the plurality of solid-state light-emitting elements may also be electrically connected in series-parallel.

The light source 3 emits lighting light by turning ON the solid-state light-emitting element(s). The color of the lighting light may be set appropriately according to, for example, the place where the lighting fixture 1 is installed and the target to light up.

In this embodiment, the light source 3 includes a road light source 31 and a ceiling light source 32 as shown in FIG. 1.

The road light source 31 is made up of four light source modules 310 as shown in FIG. 1. Inside the housing 2, these four light source modules 310 are arranged in a matrix pattern to face the front panel portion 21 of the housing 2. Inside the housing 2, a mounting plate 91 with a flat plate shape is fixed to the rear panel portion 22. The mounting plate 91 has the shape of a rectangular plate with a cutout 92 at the upper left corner thereof. On the front surface of the mounting plate 91, the four light source modules 310 are arranged to form a matrix pattern (i.e., to form a 2×2 matrix) on the right of the cutout 92.

Figure 2:
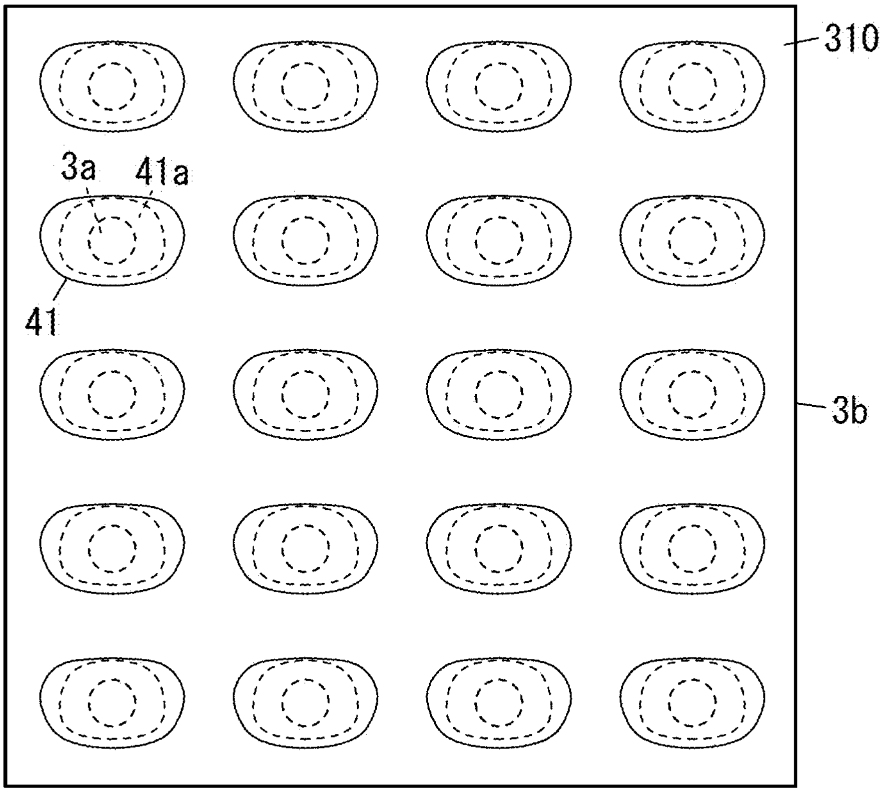
FIG. 2 is a plan view of a light source module forming part of a road light source included in the lighting fixture.

As shown in FIG. 2, each of the light source modules 310 includes a rectangular (e.g., square in the example shown in FIG. 2) substrate **3*b* and a plurality of LED elements 3*a* which are mounted on the substrate 3*b* to form a matrix pattern (e.g., to form a 5×4 matrix in FIG. 2). The light source module 310 is mounted on the front surface of the mounting plate 91 to have the LED elements 3*a* face the window 2*a* (refer to FIG. 1**).

The ceiling light source 32 is made up of two light source modules 320 as shown in FIG. 1. Inside the housing 2, the two light source modules 320 are arranged side by side in the rightward/leftward direction to face the upper panel portion 25 of the housing 2. Inside the housing 2, a mounting plate 93 with a flat plate shape is fixed onto the housing 2 to face the upper panel portion 25. The mounting plate 93 has a rectangular shape. The two light source modules 320 are arranged side by side in the rightward/leftward direction on the upper surface of the mounting plate 93.

Figure 6:
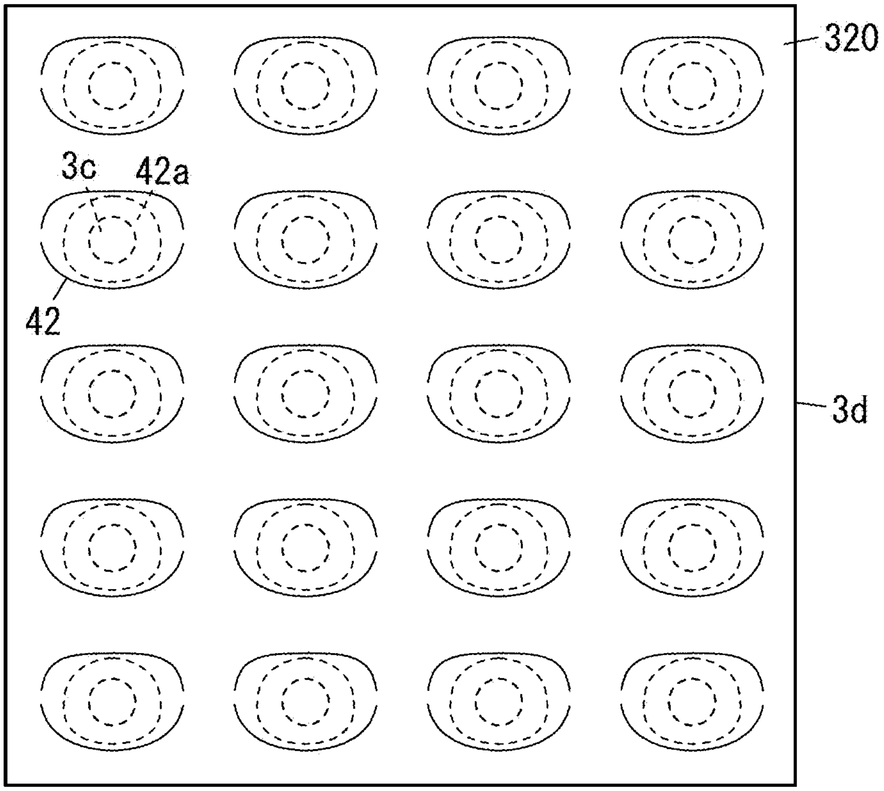
FIG. 6 is a plan view of a light source module forming part of a ceiling light source included in the lighting fixture.

As shown in FIG. 6, each of the light source modules 320 includes a rectangular (e.g., square in the example shown in FIG. 6) substrate **3*d* and a plurality of LED elements 3*c* which are mounted on the substrate 3*d* to form a matrix pattern (e.g., to form a 5×4 matrix in FIG. 2). The light source module 320 is mounted on the upper surface of the mounting plate 93 to have the LED elements 3*c* face the window 2*b* (refer to FIG. 1**).

In this embodiment, the quantity of the lighting light emitted from the road light source 31 consisting of the four light source modules 310 is greater than the quantity of the lighting light emitted from the ceiling light source 32 consisting of the two light source modules 320.

(1.2.3) Optical Member

The optical member 4 is a set of lenses.

In this embodiment, the optical member 4 includes a plurality of road lenses 41 and a plurality of ceiling lenses 42 as shown in FIG. 1. Note that each of the road lenses 41 corresponds to a first optical member according to the present disclosure that causes the first bundle of rays L1 to emerge therefrom. Each of the ceiling lenses 42 corresponds to a second optical member according to the present disclosure that causes the second bundle of rays L2 to emerge therefrom. Dividing the optical member into the first optical member and the second optical member in this manner allows the respective light distributions of the first bundle of rays L1 and the second bundle of rays L2 to be optimized, thus reducing the chances of the first bundle of rays L1 and the second bundle of rays L2 causing glare.

The housing 2 includes the upper panel portion 25 and the lower panel portion 26 as a pair of panel portions that face each other in the upward/downward direction. The optical member 4 preferably causes the second bundle of rays L2 to emerge from the upper panel portion 25, which is located over the lower panel portion 26, and travel along the inner wall surface T11 of the tunnel T1. This allows the second bundle of rays (L2) to emerge from the upper panel portion 25 in a direction aligned with the inner wall surface T11.

The optical member 4 preferably causes the second bundle of rays L2 to emerge upward of the first bundle of rays L1. The light quantity of the first bundle of rays L1 is preferably larger than that of the second bundle of rays L2. This allows the first bundle of rays L1 to be used as a main light source for lighting up the road and the second bundle of rays L2 to be used as an auxiliary light source for inspection purposes.

(1.2.3.1) Road Lenses

Figure 3:
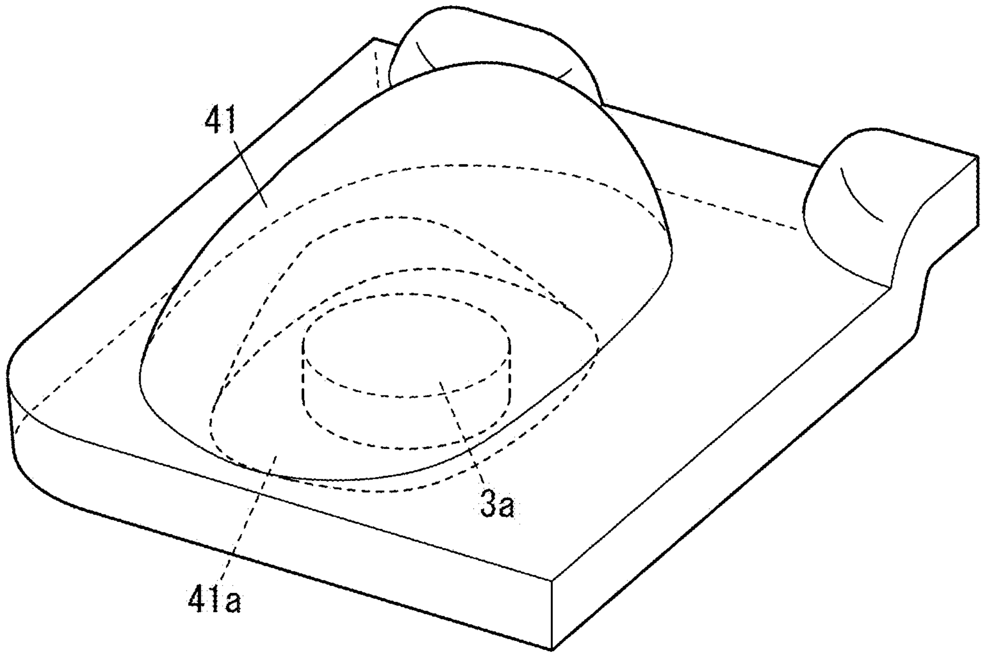
FIG. 3 is a perspective view of a road lens included in the lighting fixture.
Figure 4:
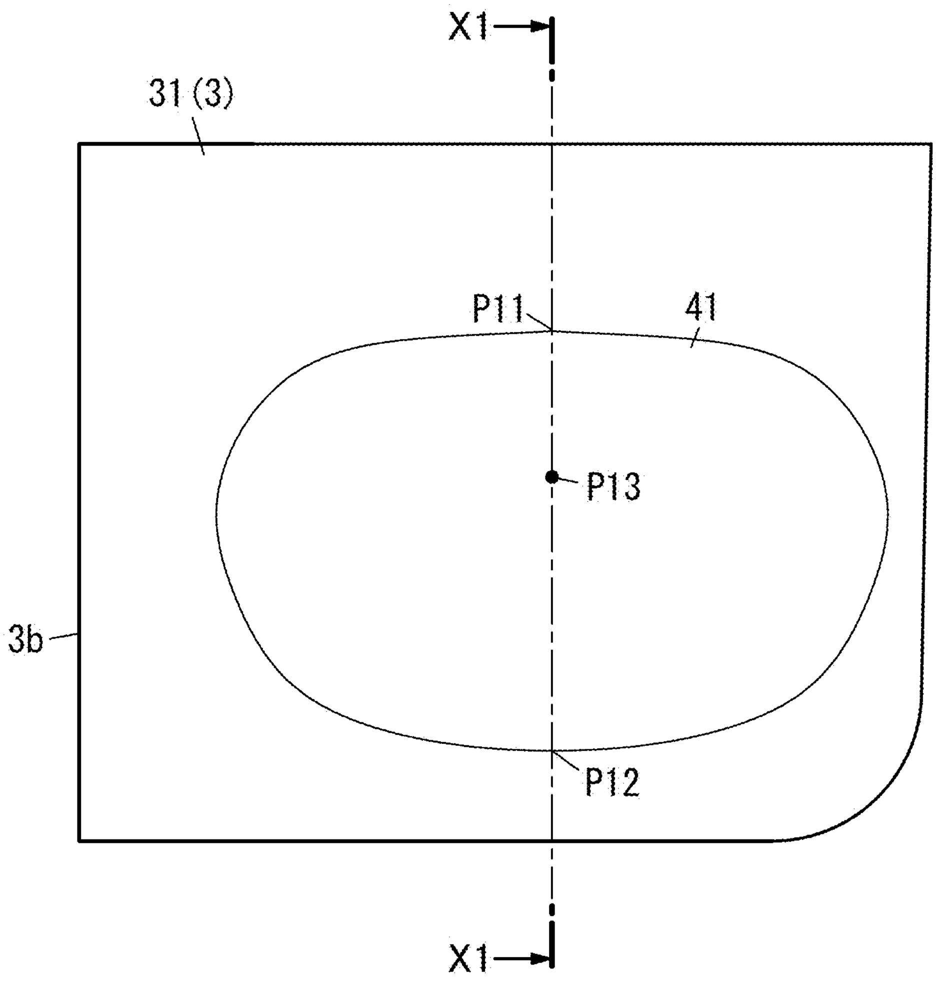
FIG. 4 is a plan view of the road lens included in the lighting fixture.

As shown in FIG. 2, each of the plurality of road lenses 41 is mounted on the substrate **3*b* to cover a corresponding one of the plurality of LED elements 3*a* included in the road light source 31. That is to say, the plurality of road lenses 41 correspond one to one to the plurality of LED elements 3*a* of the road light source 31. Each of the road lenses 41 has the shape of a compressed dome which is elongate in the rightward/leftward direction (i.e., the direction in which the left panel portion 23 and the right panel portion 24 face each other) as shown in FIGS. 3 and 4. The road lens 41 has a planar back surface in contact with the substrate 3*b*. The back surface has a recess 41*a* having the shape of a compressed dome. Each of the LED elements 3*a* mounted on the substrate 3*b* is housed inside the recess 41*a* of a corresponding one of the road lenses 41 mounted on the substrate 3*b*. Turning an LED element 3*a* ON inside the recess 41*a* causes the lighting light emitted from the LED element 3*a* to be incident on a corresponding one of the road lenses 41. Then, the lighting light emitted from the LED element 3*a* is transmitted through the road lens 41 to emerge from the surface of the road lens 41 as the first bundle of rays L1**.

Figure 5:
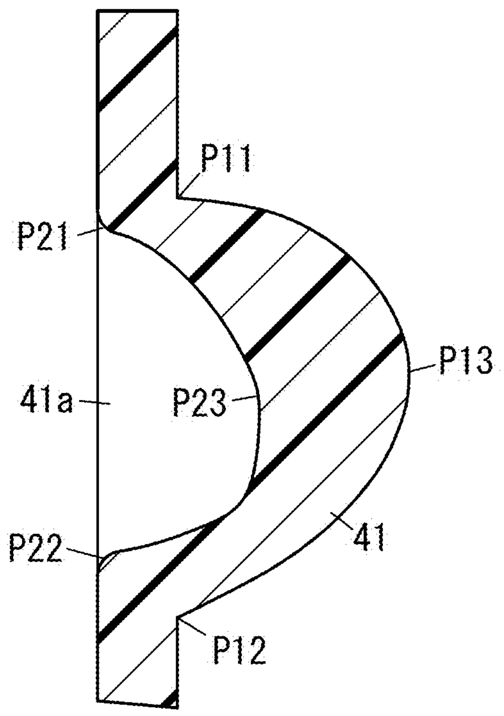
FIG. 5 is a cross-sectional view of the road lens included in the lighting fixture.

The surface shape of the road lens 41 is symmetric with respect to the longitudinal axis of the road lens 41 but asymmetric with respect to the latitudinal axis (which is perpendicular to the longitudinal axis) of the road lens 41. Likewise, the shape of the recess **41*a* is also symmetric with respect to the longitudinal axis of the road lens 41 but asymmetric with respect to the latitudinal axis of the road lens 41. FIG. 5 is a cross-sectional view of the road lens 41 taken along a plane X1-X1 (refer to FIG. 4), i.e., a plane aligned with the latitudinal axis of the road lens 41**.

Both ends, facing each other in the latitudinal axis, of the surface of the road lens 41 will be hereinafter referred to as a "first end P11" and a "second end P12," respectively. In that case, the surface of the road lens 41 rises steeply from the first end P11 to reach a peak P13 of the surface of the road lens 41 and then slopes gently downward from the peak P13 to reach the second end P12. That is to say, the surface of the road lens 41 slopes more steeply on one part thereof including the first end P11 than on the other part including the second end P12.

Both ends, facing each other in the latitudinal axis, of the recess 41*a* of the road lens 41 will be hereinafter referred to as a "first end P21" and a "second end P22," respectively. Along the latitudinal axis, the first end P21 of the recess 41*a* is located on the same side as the first end P11 of the surface of the road lens 41 and the second end P22 of the recess 41*a* is located on the same side as the second end P12 of the surface of the road lens 41. In that case, the recess 41*a* rises gently from the first end P21 to reach a peak P23 of the recess 41*a* and then slopes steeply downward from the peak P23 to reach the second end P22. That is to say, the recess 41*a* slopes more gently on one part thereof including the first end P21 than on the other part including the second end P22.

Furthermore, the surface of the road lens 41 is smoother than the surface (refer to FIG. 9) of the ceiling lens 42 (to be described later) and the peak P13 of the road lens 41 is more compressed than the peak P33 (refer to FIG. 9) of the ceiling lens 42 (to be described later). Furthermore, the inner surface of the recess 41*a* is more angulate than the inner surface (refer to FIG. 9) of the recess 42*a* of the ceiling lens 42 (to be described later) and the peak P23 of the recess 41*a* is more pointed than the peak P43 (refer to FIG. 9) of the recess 42*a* of the ceiling lens 42 (to be described later).

Inside the housing 2, the longitudinal axis of each road lens 41 is aligned with the direction in which the left panel portion 23 and the right panel portion 24 face each other, and the latitudinal axis of the road lens 41 is aligned with the direction in which the upper panel portion 25 and the lower panel portion 26 face each other.

Figure 11:
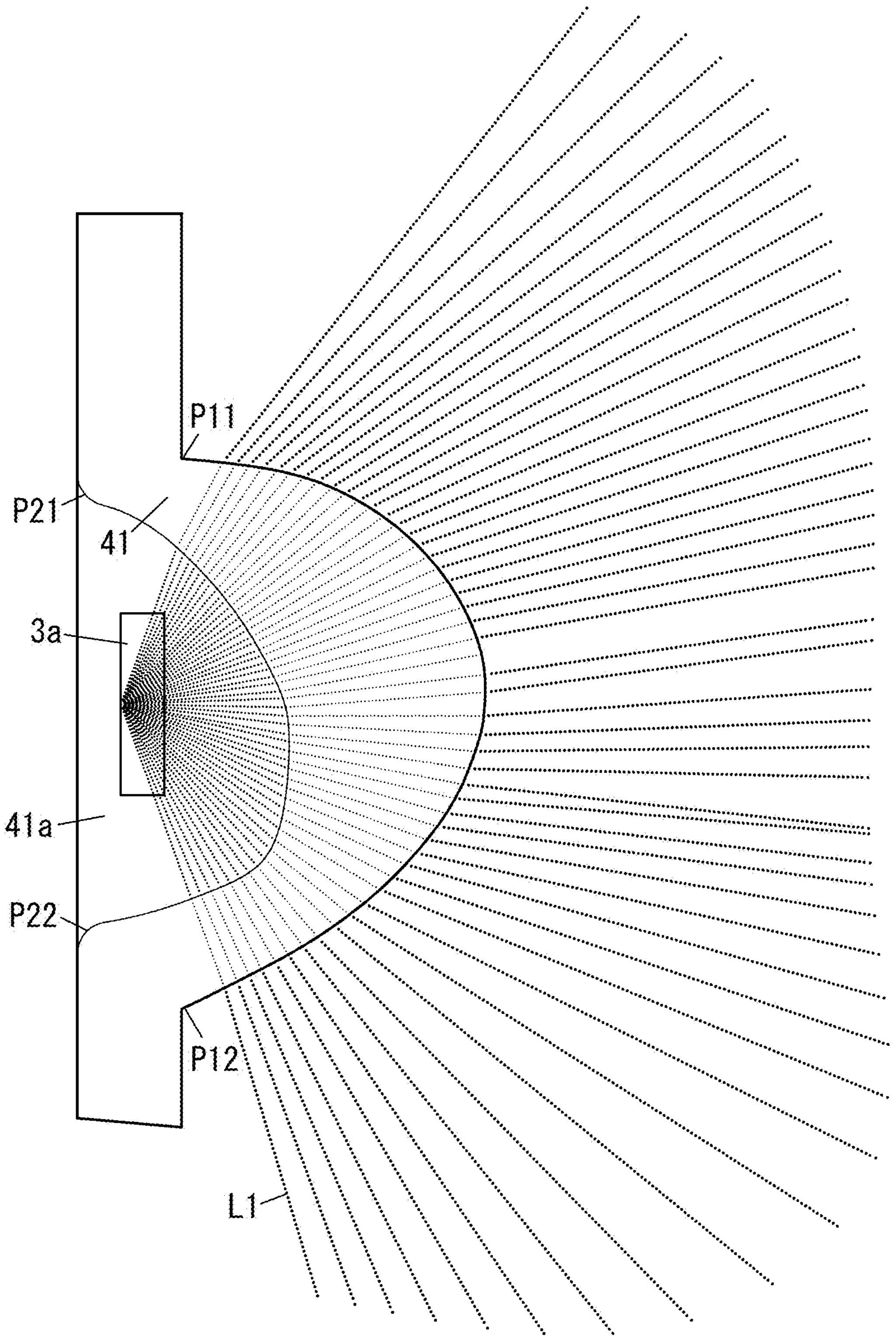
FIG. 11 illustrates the light distribution characteristics of a first bundle of rays emerging from a road lens of the lighting fixture.

As shown in FIG. 10, when the housing 2 is mounted on the inner wall surface T11 of the tunnel T1, the first end P11 of each road lens 41 is located above the second end P12 thereof and the first end P21 of each recess 41*a* is located above the second end P22 thereof. The lighting light emitted from each LED element 3*a* inside the recess 41*a* emerges as the first bundle of rays L1 shown in FIG. 11 from the surface of the road lens 41. As a result, if the housing 2 is mounted on the inner wall surface T11 to make the window 2*a* of the housing 2 face obliquely downward as shown in FIG. 10, the first bundle of rays L1 emerging from the surface of the road lens 41 is mostly directed toward, and irradiate, the road R1 (refer to FIG. 10) through the window 2*a* of the housing 2 (refer to FIG. 1). Directing the first bundle of rays L1 toward the road R1 lights up the field of view of the driver who is driving the vehicle C1 along the road R1, thereby allowing the driver to drive his or her vehicle C1 more safely.

(1.2.3.2) Ceiling Lens

Figure 7:
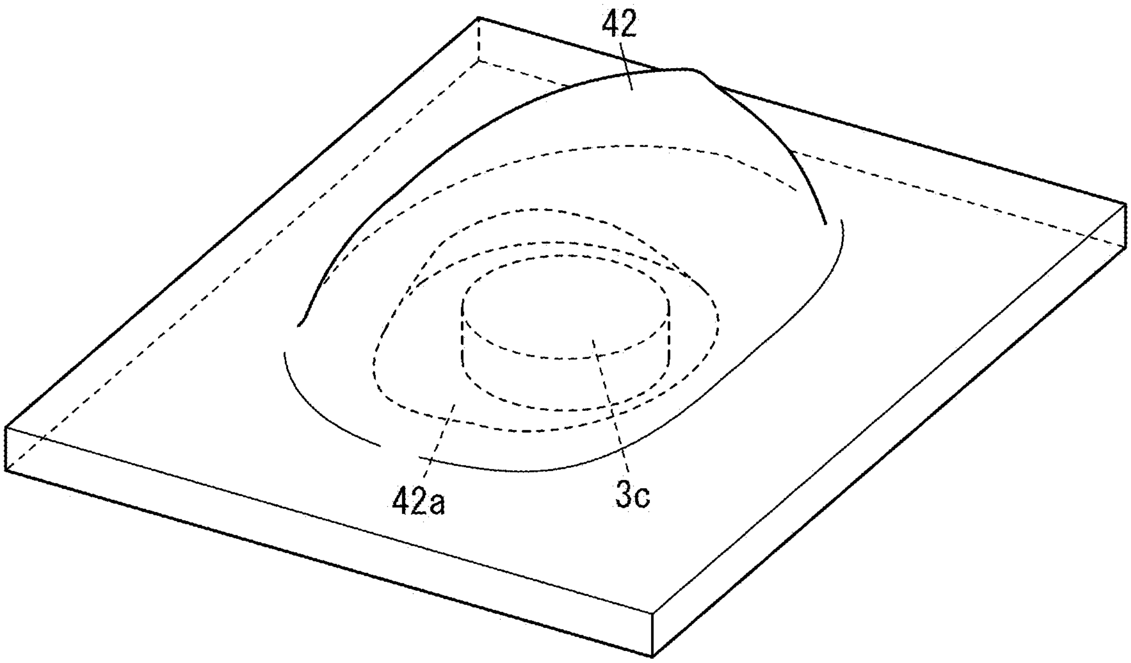
FIG. 7 is a perspective view of a ceiling lens included in the lighting fixture.
Figure 8:
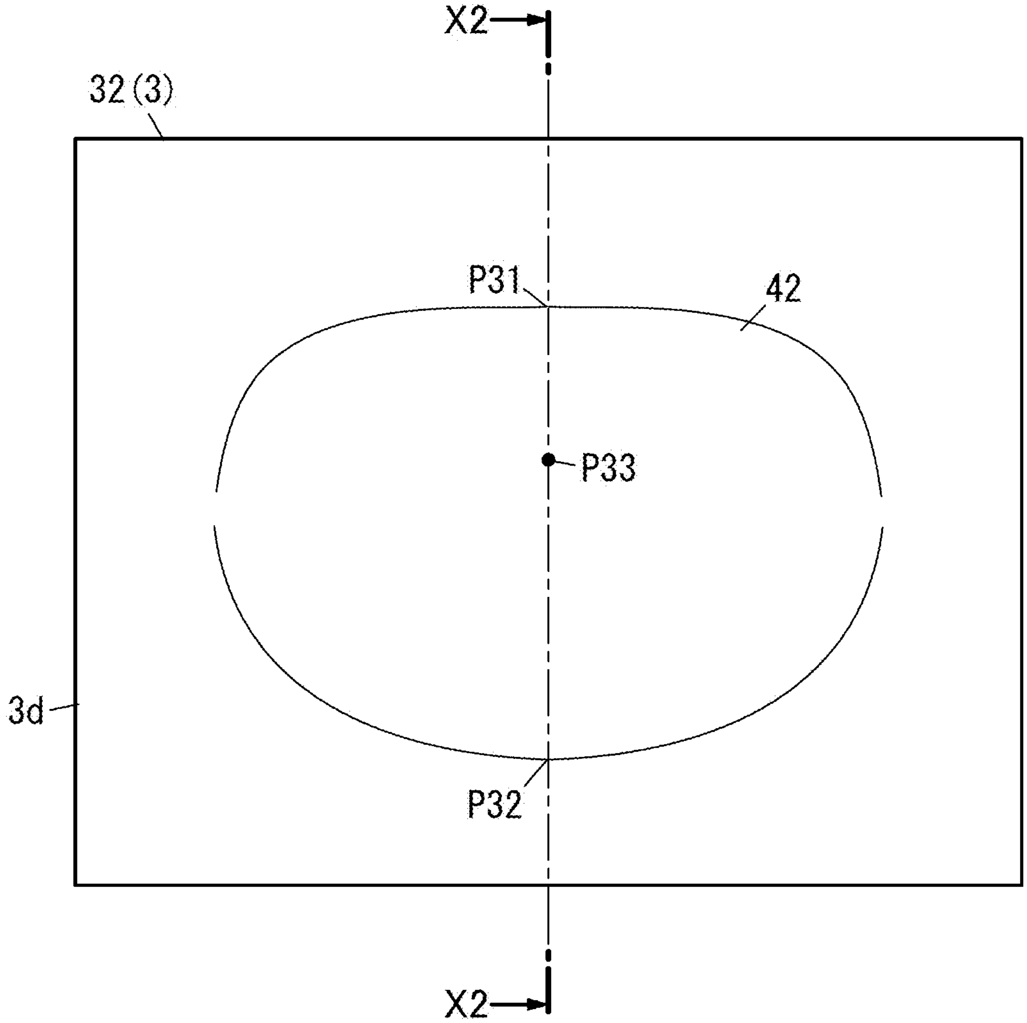
FIG. 8 is a plan view of the ceiling lens included in the lighting fixture.

As shown in FIG. 6, each of the plurality of ceiling lenses 42 is mounted on the substrate 3*d* to cover a corresponding one of the plurality of LED elements 3*c* included in the ceiling light source 32. That is to say, the plurality of ceiling lenses 42 correspond one to one to the plurality of LED elements 3*c* of the ceiling light source 32. Each of the ceiling lenses 42 has the shape of a compressed dome which is elongate in the rightward/leftward direction as shown in FIGS. 7 and 8. The ceiling lens 42 has a planar back surface in contact with the substrate 3*d*. The back surface has a recess 42*a* with the shape of a compressed dome. Each of the LED elements 3*c* mounted on the substrate 3*d* is housed inside the recess 42*a* of a corresponding one of the ceiling lenses 42 mounted on the substrate 3*d*. Turning an LED element 3*c* ON inside the recess 42*a* causes the lighting light emitted from the LED element 3*c* to be incident on a corresponding one of the ceiling lenses 42. Then, the lighting light emitted from the LED element 3*c* is transmitted through the ceiling lens 42 to emerge from the surface of the ceiling lens 42 as the second bundle of rays L2.

Figure 9:
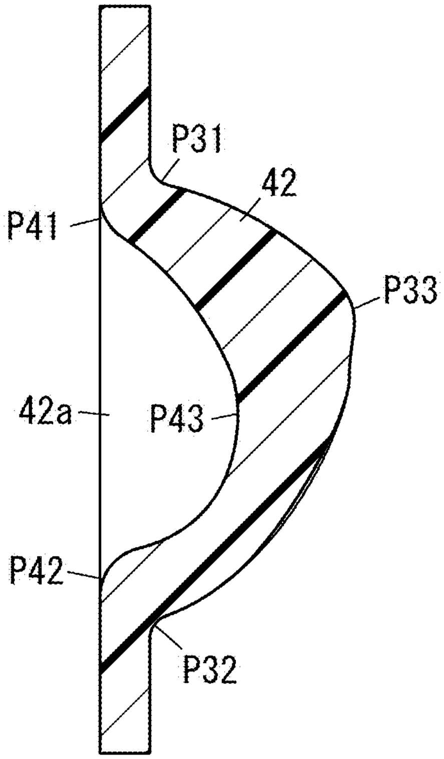
FIG. 9 is a cross-sectional view of the ceiling lens included in the lighting fixture.

The surface shape of the ceiling lens 42 is symmetric with respect to the longitudinal axis of the ceiling lens 42 but asymmetric with respect to the latitudinal axis (which is perpendicular to the longitudinal axis) of the ceiling lens 42. Likewise, the shape of the recess 42*a* is also symmetric with respect to the longitudinal axis of the ceiling lens 42 but asymmetric with respect to the latitudinal axis of the ceiling lens 42. FIG. 9 is a cross-sectional view of the ceiling lens 42 taken along a plane X2-X2 (refer to FIG. 8), i.e., a plane aligned with the latitudinal axis of the ceiling lens 42.

Both ends, facing each other in the latitudinal axis, of the surface of the ceiling lens 42 will be hereinafter referred to as a "first end P31" and a "second end P32," respectively. In that case, the surface of the ceiling lens 42 rises steeply from the first end P31 to reach a peak P33 of the surface of the ceiling lens 42 and then slopes gently downward from the peak P33 to reach the second end P32. That is to say, the surface of the ceiling lens 42 slopes more steeply on one part thereof including the first end P31 than on the other part including the second end P32.

Both ends, facing each other in the latitudinal axis, of the recess 42*a* of the ceiling lens 42 will be hereinafter referred to as a "first end P41" and a "second end P42," respectively. Along the latitudinal axis, the first end P41 of the recess 42*a* is located on the same side as the first end P31 of the surface of the ceiling lens 42 and the second end P42 of the recess 42*a* is located on the same side as the second end P32 of the surface of the ceiling lens 42. In that case, the recess 43*a* rises gently from the first end P41 to reach a peak P43 of the recess 42*a* and then slopes steeply downward from the peak P43 to reach the second end P42. That is to say, the recess 42*a* slopes more gently on one part thereof including the first end P41 than on the other part including the second end P42.

Furthermore, the surface of the ceiling lens 42 is more angulate than the surface (refer to FIG. 9) of the road lens 41 (refer to FIG. 5) and the peak P33 of the ceiling lens 42 is more pointed than the peak P13 (refer to FIG. 5) of the road lens 41. Furthermore, the inner surface of the recess 42*a* is smoother than the inner surface (refer to FIG. 5) of the recess 41*a* of the road lens 41 and the peak P43 of the recess 42*a* is more compressed than the peak P23 (refer to FIG. 5) of the recess 41*a* of the road lens 41.

Inside the housing 2, the longitudinal axis of each ceiling lens 42 is aligned with the direction in which the left panel portion 23 and the right panel portion 24 face each other, and the latitudinal axis of the ceiling lens 42 is aligned with the direction in which the front panel portion 21 and the rear panel portion 22 face each other.

Figure 12:
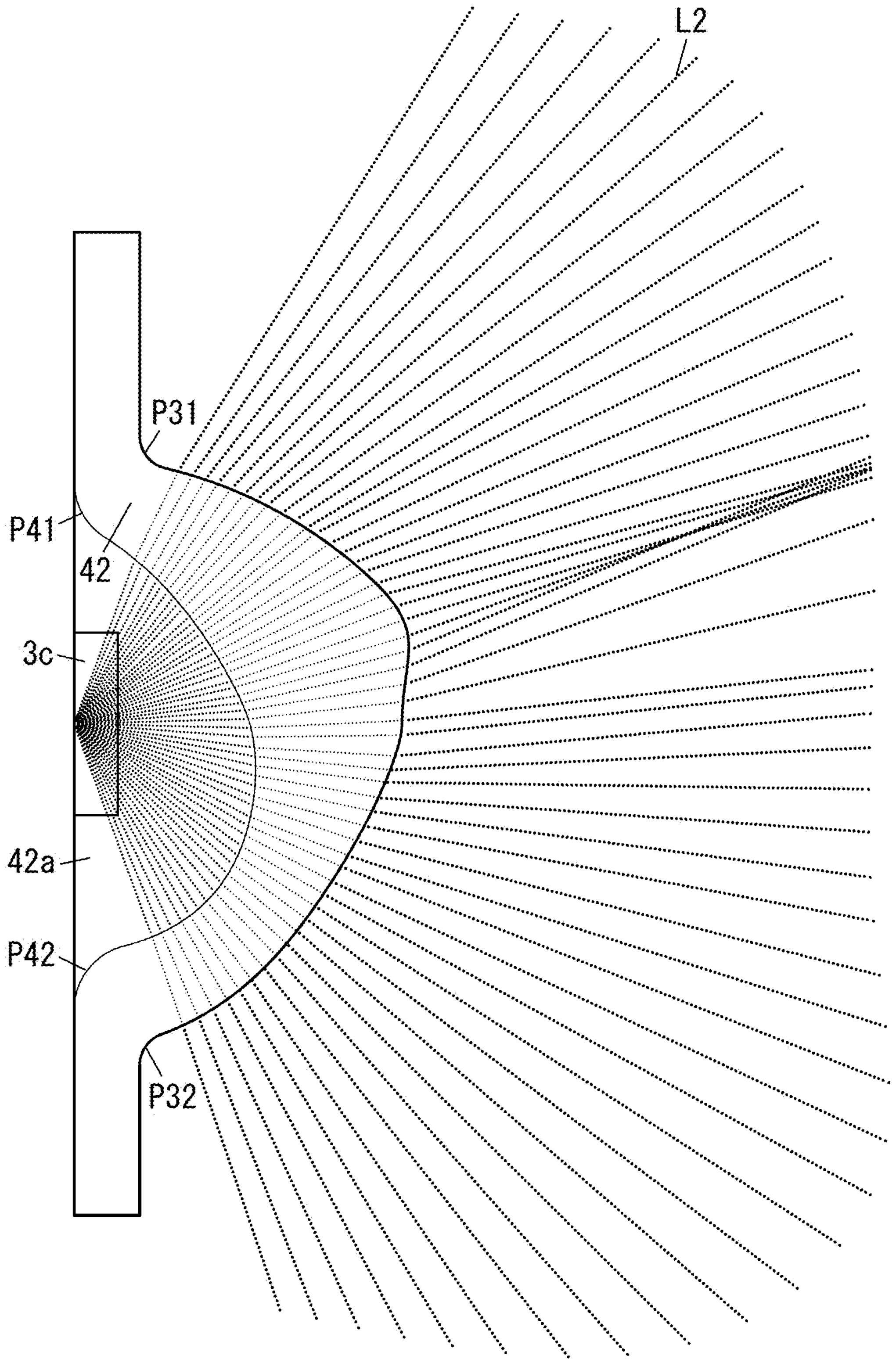
FIG. 12 illustrates the light distribution characteristics of a second bundle of rays emerging from a ceiling lens of the lighting fixture.

As shown in FIG. 10, when the housing 2 is mounted on the inner wall surface T11 of the tunnel T1, the first end P31 of the surface of each ceiling lens 42 is located closer to the rear panel portion 22 than the second end P32 thereof is and the second end P32 is located closer to the front panel portion 21 than the first end P31 is. The lighting light emitted from each LED element 3*c* inside the recess 42*a* emerges as the second bundle of rays L2 shown in FIG. 12 from the surface of the ceiling lens 42. Specifically, the ceiling lens 42 has such light distribution characteristics that causes more light to be distributed backward rather than forward, and therefore, the second bundle of rays L2 travels mostly backward. As a result, the second bundle of rays L2 emerging from the surface of the ceiling lens 42 is transmitted through the window 2*b* of the housing 2 (refer to FIG. 1) and directed mostly along the inner wall surface T11 of the tunnel T1 (refer to FIG. 10) toward an upper part of the inner wall surface T11. Specifically, the optical axis of the second bundle of rays L2 extends in a direction aligned with the chord of the arc-shaped inner wall surface T11, thus causing the second bundle of rays L2 to travel through the window 2*b* of the upper panel portion 25 of the housing 2 and along the inner wall surface T11 and irradiate the upper part of the inner wall surface T11. The second bundle of rays L2 irradiating the inner wall surface T11 lights up the upper part of the inner wall surface T11 to ensure sufficient brightness for the inner wall surface T11.

As can be seen, the second bundle of rays L2 travels through the window 2*b* of the upper panel portion 25 of the housing 2 and along the inner wall surface T11 of the tunnel T1 to irradiate the upper part of the inner wall surface T11. That is to say, the ceiling lens 42 causes the second bundle of rays L2 to emerge from the upper panel portion 25 and travel along the inner wall surface T11 of the tunnel T1. As a result, various imperfections, such as ruggedness, fractures, and flaking, of the inner wall surface T11 are highlighted with the second bundle of rays L2 within the irradiation range of the second bundle of rays L2, thus making the conditions (such as the presence or absence of any imperfections) of the inner wall surface T11 easily recognizable either optically or visually.

(1.2.3.3) Light Distribution

FIG. 10 illustrates the light distributions of the first bundle of rays L1 and second bundle of rays L2 emitted from the lighting fixture 1 installed inside the tunnel T1. In FIG. 10, shown are two lighting fixtures 1 which are arranged on both sides of the inner wall surface T11 inside the tunnel T1 to face each other with the road R1, on which the vehicle C1 travels, interposed between themselves. Each of these two lighting fixtures 1 irradiates the road R1 with the first bundle of rays L1 and irradiates the inner wall surface T11 with the second bundle of rays L2.

Specifically, the optical member 4 of each of these lighting fixtures 1 causes the second bundle of rays L2 to emerge upward of the first bundle of rays L1. The first bundle of rays L1 is generated by the road light source 31 made up of the four light source modules 310. The second bundle of rays L2 is generated by the ceiling light source 32 made up of the two light source modules 320. Thus, the quantity of the first bundle of rays L1 emitted from each lighting fixture 1 is larger than that of the second bundle of rays L2 emitted from the same lighting fixture 1.

As can be seen, the lighting fixture 1 not only serves mostly as a road light for irradiating the road R1 inside the tunnel T1 but also serves as a ceiling light used for inspection purposes.

(1.2.4) Shooting Unit

The shooting unit 5 includes a lens and a plurality of image sensors. Examples of the image sensors include a charge-coupled device (CCD) image sensor and a complementary metal-oxide semiconductor (CMOS) image sensor. The image sensors each receive the light condensed by the lens, thereby transforming an image produced on a photosensitive plane into an electrical signal. The shooting unit 5 generates data about a captured image based on the electrical signals output by the plurality of image sensors. The captured image may be either a color or monochrome still picture or moving picture. The shooting unit 5 outputs the data about the captured image to the circuit block 6.

The shooting unit 5 is disposed in the cutout 92 of the mounting plate 91 inside the housing 2 as shown in FIG. 1. The optical axis (shooting direction) of the shooting unit 5 is oriented through the window 2*b* of the housing 2 toward the inner wall surface T11 of the tunnel T1. In other words, the optical axis of the shooting unit 5 passes through the window 2*b* to extend in a direction aligned with the chord of the arc-shaped inner wall surface T11. The shooting range of the shooting unit 5 forms at least a part of the irradiation range of the second bundle of rays L2. The shooting unit 5 shoots the inner wall surface T11 irradiated with the second bundle of rays L2.

The shooting unit 5 shoots the irradiation range of the second bundle of rays L2 emerging through the window 2*b* in the direction aligned with the chord of the inner wall surface T11 as described above, thus allowing for creating image data in which various imperfections such as ruggedness, fractures, and flaking of the inner wall surface T11 are highlighted with the second bundle of rays L2.

(1.2.5) Circuit Block

The circuit block 6 preferably includes a computer system. That is to say, in the circuit block 6, some or all of the functions of the circuit block 6 are performed by making a processor such as a central processing unit (CPU) or micro processing unit (MPU) read out a program stored in a memory and execute the program. The circuit block 6 includes, as a principal hardware component thereof, a processor which operates following a program. Any type of processor may be used without limitation as long as the processor may perform its functions by executing the program. The processor may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC or an LSI include integrated circuits called a "system LSI," a "very-large-scale integrated circuit (VLSI)," and an "ultra-large-scale integrated circuit (ULSI)." Optionally, a field-programmable gate array (FPGA) to be programmed after an LSI has been fabricated or a reconfigurable logic device allowing the connections or circuit sections inside of an LSI to be reconfigured may also be used for the same purpose. Those electronic circuits may be either integrated together on a single chip or distributed on multiple chips, whichever is appropriate. Those multiple chips may be aggregated together or distributed without limitation.

Figure 13:
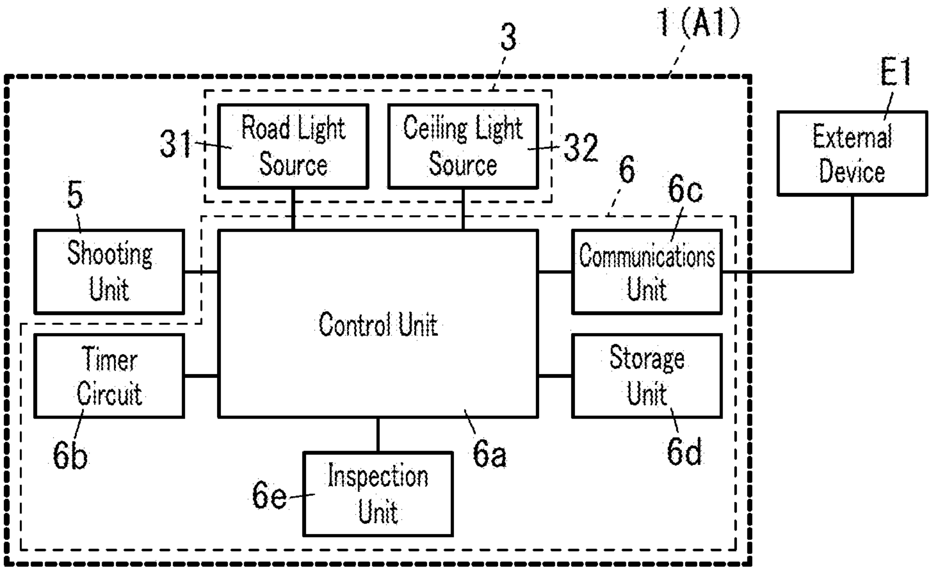
FIG. 13 is a block diagram showing a configuration for the lighting fixture.

In FIG. 1, the circuit block 6 is mounted on the mounting plate 91 to be located under the cutout 92. As shown in FIG. 13, the circuit block 6 includes a control unit 6*a*, a timer circuit 6*b*, a communications unit 6*c*, a storage unit 6*d*, and an inspection unit 6*e*.

(1.2.5.1) Light Source Driving and Light Source Control

The control unit 6*a* has a light source driving function of supplying a drive current to the light sources 3 (namely, the road light source 31 and the ceiling light source 32) and a light source control function of selectively supplying the drive current or cutting off the supply of the drive current. Specifically, the control unit 6*a* supplies the drive current to the road light source 31 and the ceiling light source 32. In addition, the control unit 6*a* also selectively supplies, or cuts off the supply of, the drive current to the road light source 31. The control unit 6*a* also selectively supplies, or cuts off the supply of, the drive current to the ceiling light source 32. That is to say, the control unit 6*a* selectively causes the road R1 to be irradiated with the first bundle of rays L1 by turning ON and OFF the road light source 31 and selectively causes the ceiling to be irradiated with the second bundle of rays L2 by turning ON and OFF the ceiling light source 32.

It is preferable that the control unit 6*a* cause the first bundle of rays L1 and the second bundle of rays L2 to be radiated simultaneously. That is to say, the first bundle of rays L1 and the second bundle of rays L2 are preferably caused to emerge simultaneously. Specifically, the control unit 6*a* always keeps the road light source 31 ON and always keeps the ceiling light source 32 ON as well. This allows the lighting fixture 1 to not only keep lighting up the road R1 even during the inspection but also keep the internal space of the tunnel T1 visually recognizable even during the inspection. In addition, this also allows, even when some light modules of the road light source 31 or the ceiling light source 32 are not available, the internal space of the tunnel T1 to be lit up as brightly as possible, thus reducing the chances of causing a significant decline in the visibility inside the tunnel T1.

(1.2.5.2) Shooting Control

The control unit 6*a* has a shooting control function of controlling the operation of the shooting unit 5. Furthermore, the timer circuit 6*b* has the function of recording the current time. Specifically, the control unit 6*a* adds, based on the time recorded by the timer circuit 6*b*, data indicating the time when a captured image was generated by the shooting unit 5, to the data of the captured image generated by the shooting unit 5. This allows the lighting fixture 1 to associate the captured image with the shooting time.

Optionally, the control unit 6*a* may also control the timing for the shooting unit 5 to perform shooting based on the result of time recording by the timer circuit 6*b*. That is to say, the shooting unit 5 performs shooting at the timing specified by the result of time recording by the timer circuit 6*b*. For example, the control unit 6*a* may control the schedule indicating timings for the shooting unit 5 to perform shooting such that the inner wall surface T11 is shot a predetermined number of times (at least once) when it is a predetermined time of a predetermined day. Alternatively, the control unit 6*a* may also set the shooting timing periodically to cause the shooting unit 5 to shoot the inner wall surface T11 at regular intervals. As can be seen, having the shooting unit 5 perform shooting at the timing specified by the result of time recording by the timer circuit 6*b* allows the shooting timing to be set flexibly.

(1.2.5.3) Inspection

The inspection unit 6*e* is provided for the housing 2 to inspect the inner wall surface T11 based on the captured image of the inner wall surface T11 shot by the shooting unit 5. The inspection unit 6*e* subjects the captured image of the inner wall surface T11 to image recognition processing, thereby determining whether or not the inner wall surface T11 has any imperfections such as ruggedness, fractures, or flaking.

In this embodiment, the inspection unit 6*e* preferably includes a learned model generated by machine learning such as deep learning that uses, for example, a large number of captured images as supervised data. The learned model may be constructed by, for example, deep learning that uses fully convolutional networks (FCN). Then, the learned model receives, as input, the data about the captured images and outputs the results of decisions made about the presence or absence of any imperfections in/from the inner wall surface T11.

Note that the algorithm carried out by the inspection unit 6*e* is not limited to any particular algorithm. The learned model may also be a model which uses any other algorithm such as the multiple regression analysis or the support vector machine.

The inspection unit 6*e* may be configured to perform the inspection every time the shooting unit 5 generates a captured image, perform the inspection at regular intervals, or perform the inspection when the communications unit 6*c* (to be described later) receives an inspection request from the external device E1 or when a particular event occurs, whichever is appropriate.

Optionally, the inspection unit 6*e* may detect a time-dependent change in the conditions of the inner wall surface T11 based on a plurality of captured images which have been generated along the time series. This enables the inspection unit 6*e* to predict the occurrence of imperfections to the inner wall surface T11, thus allowing for preventing the inner wall surface T11 from causing such imperfections.

Data about the results of inspection made by the inspection unit 6*e* is stored in the storage unit 6*d*. The storage unit 6*d* is preferably a programmable nonvolatile memory such as an electrically erasable programmable read-only memory (EEPROM) or a flash memory. However, this is only an example and the storage unit 6*d* is not limited to any particular storage medium.

(1.2.5.4) Communication

The lighting fixture 1 preferably further includes a communications unit 6*c* for communicating with the external device E1 as shown in FIG. 13. The external device E1 may be, for example, a server device which is installed at a location distant from the tunnel T1 and is managed by an organization that inspects the tunnel T1 (hereinafter referred to as an "inspection organization"). The inspection organization provides services on the inspection of the inner wall surface T11. Note that the inspection organization may be either a private organization or a public organization, whichever is appropriate.

The external device E1 transmits a shooting request to the lighting fixture 1 at a predetermined timing, for example. The shooting request is a signal (command) that requests the lighting fixture 1 to shoot the inner wall surface T11 using the shooting unit 5. When the communications unit 6*c* receives the shooting request, the control unit 6*a* instructs the shooting unit 5 to shoot the inner wall surface T11. That is to say, when the communications unit 6*c* receives the shooting request, the shooting unit 5 performs the shooting operation. This allows the timing for the shooting unit 5 of the lighting fixture 1 to perform shooting to be set by remote control.

Also, the control unit 6*a* of the lighting fixture 1 may have the communications unit 6*c* transmit the result of inspection by the inspection unit 6*e* to the external device E1. The timing for the communications unit 6*c* to transmit the result of inspection may be every time the inspection is done, at regular intervals, or when the communications unit 6*c* receives a request for transmitting the result of inspection from the external device E1, whichever is appropriate. The control unit 6*a* reads out the result of inspection stored in the storage unit 6*d*, thereby allowing the communications unit 6*c* to transmit multiple results of inspection during a predetermined period collectively to the external device E1.

Optionally, the communications unit 6*c* may also transmit, based on the result of inspection by the inspection unit 6*e*, a repair request, as a request for repairing the inner wall surface T11, to the external device E1. Specifically, if any imperfections are found on the inner wall surface T11, the communications unit 6*c* transmits the repair request, along with the result of inspection, to the external device E1. In response, the external device E1 visually and auditorily presents, to the inspector who is engaged in the services of the inspection organization, that a repair is requested along with the result of inspection. Then, in accordance with the result of inspection presented, the inspector takes preparatory steps to make repair and maintenance of the inner wall surface T11 of the tunnel T1. That is to say, this allows the lighting fixture 1 to request the inspection organization quickly to take preparatory steps to make repair and maintenance of the inner wall surface T11.

Furthermore, the communications unit 6*c* preferably receives weather information about the weather in the area where the tunnel T1 is located to set the frequency of shooting for the shooting unit 5 based on the weather information. In that case, the communications unit 6*c* receives the weather information from a server, for example, via a communication channel including the Internet. The weather information includes pieces of information such as a weather forecast for the area where the tunnel T1 is located and the current weather in that area. Then, the control unit 6*a* sets the timing for shooting unit 5 to perform shooting according to the weather information. For example, if any rainstorm, strong wind, heavy snow, or typhoon has happened or is predicted, then the control unit 6*a* decides that the bad weather adversely affect the conditions of the inner wall surface T11 of the tunnel T1 (e.g., worsen the deterioration such as cracks of the inner wall surface T11) and increases the frequency of shooting for the shooting unit 5 and the frequency of performing the inspection. Optionally, the communications unit 6*c* may receive disaster information about the area where the tunnel T1 is located and the frequency of shooting for the shooting unit 5 may also be set in accordance with the disaster information. Examples of the disaster information include pieces of information about earthquakes, fires, and traffic accidents. This allows the lighting fixture 1 to contribute to improving the accuracy of inspection on the outbreak of a bad weather or a disaster.

The wireless communication is preferably established by the communications unit 6*c* via a cellular phone network (i.e., a communication compliant with any of the standards such as the fifth-generation network (5G), the fourth-generation network (4G), and the long-term evolution (LTE) network). Alternatively, the communications unit 6*c* may also establish wireless communication compliant with any of the communications protocols such as Bluetooth®, Bluetooth low energy, Wi-Fi®, ZigBee®, and a low power radio station (Specified Low-Power Radio Station) requiring no licenses. Alternatively, a wired communication may also be established by the communications unit 6*c* via a twisted pair cable, a dedicated communications line, or a local area network (LAN) cable, for example.

(1.2.6) Advantages

The lighting fixture 1 described above not only serves mostly as a road light for irradiating the road R1 inside the tunnel T1 but also serves as a ceiling light used for inspection purposes, all by itself. In addition, the lighting fixture 1 includes a shooting unit 5 and also has the shooting function of shooting the inner wall surface T11 irradiated with the second bundle of rays L2.

Thus, installing the lighting fixture 1 inside the tunnel T1 allows for shooting the inner wall surface T11 while irradiating the inner wall surface T11 of the tunnel T1 with the second bundle of rays L2. Therefore, the lighting fixture 1 may shoot, without using any service vehicle, the inner wall surface T11 even in the daytime when there is relatively heavy traffic. In addition, the lighting fixture 1 eliminates the need to secure any service vehicles or workers to improve the accuracy of inspection. That is to say, installing the lighting fixture 1 inside the tunnel T1 allows for eliminating various constraints that will be normally imposed when the inner wall surface of a tunnel is shot using a service vehicle for inspection purposes. Consequently, the lighting fixture 1 may shoot the inner wall surface T11 of the tunnel T1 easily.

Furthermore, the lighting fixture 1 includes an inspection unit 6*e* as an integral constituent element thereof. This allows the lighting fixture 1 to have all of lighting, shooting, and inspection done by itself. That is to say, the tunnel T1 may be lit up and the inner wall surface T11 thereof may be shot and inspected just by installing the lighting fixture 1 inside the tunnel T1, thus significantly improving the handiness when operating the tunnel T1.

(2) FIRST VARIATION

Figure 14:
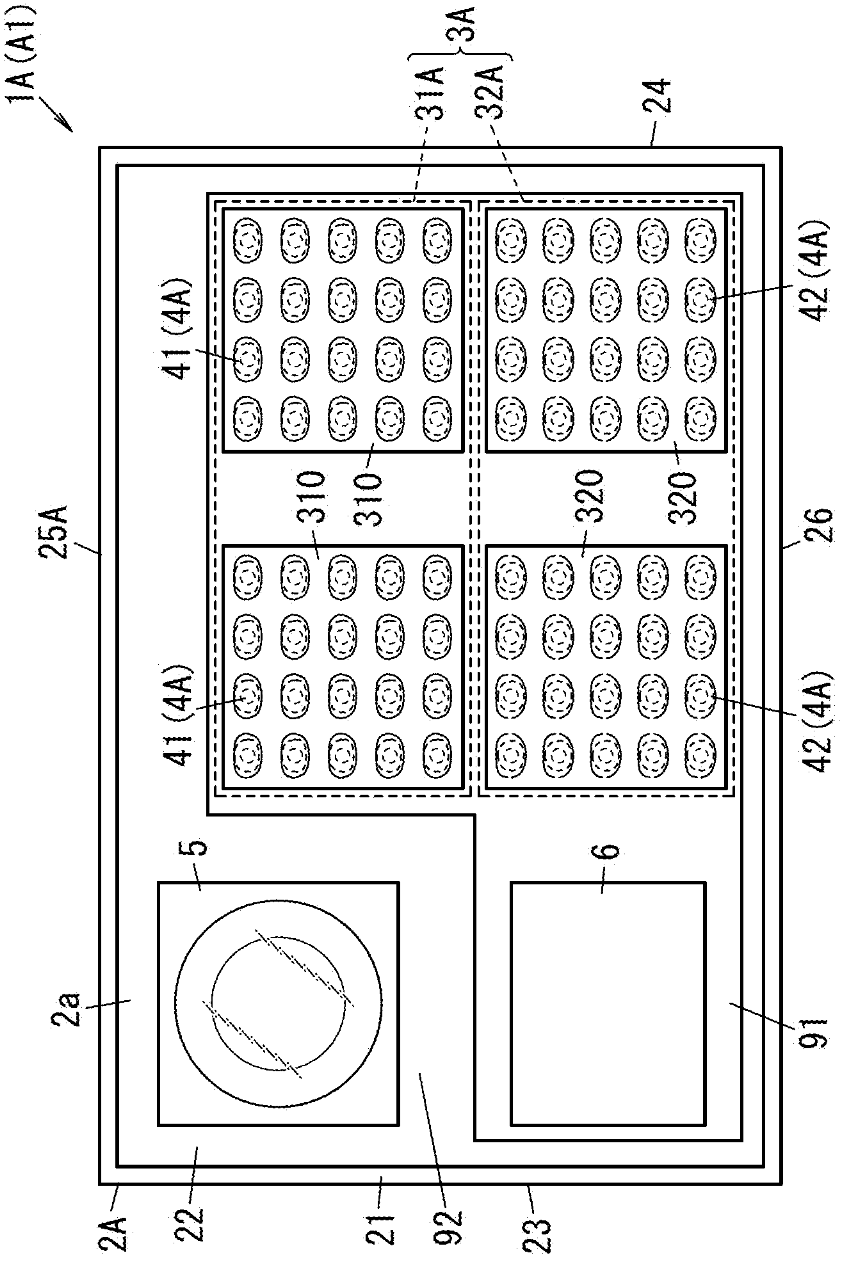
FIG. 14 is a front view illustrating a lighting fixture corresponding to a lighting system according to a first variation.

FIG. 14 illustrates a lighting fixture 1A according to a first variation.

The lighting fixture 1A includes a housing 2A, a light source 3A, an optical member 4A, and the shooting unit 5. In addition, the lighting fixture 1A further includes the circuit block 6. In the following description, any constituent element of the lighting fixture 1A according to this first variation, having the same function as a counterpart of the lighting fixture 1 according to the embodiment described above, will be designated by the same reference numeral as that counterpart's, and description thereof will be omitted herein.

The housing 2A is a casing having the shape of a hollow rectangular parallelepiped and includes the front panel portion 21, the rear panel portion 22, the left panel portion 23, the right panel portion 24, an upper panel portion 25A, and the lower panel portion 26, all of which have a rectangular shape. The upper panel portion 25A does not have the window 2*b* that the upper panel portion 25 of the lighting fixture 1 has. Thus, the upper panel portion 25A has the shape of a rectangular plate.

In the first variation, the light source 3A includes a road light source 31A and a ceiling light source 32A.

The road light source 31A is made up of two light source modules 310 (refer to FIG. 2). The two light source modules 310 are arranged side by side in the rightward/leftward direction in an upper part of the front surface of the mounting plate 91 so as to face the window 2*a*. The ceiling light source 32A is made up of two light source modules 320 (refer to FIG. 6). The two light source modules 320 are arranged side by side in the rightward/leftward direction in a lower part of the front surface of the mounting plate 91 so as to face the window 2*a*. That is to say, on the front surface of the mounting plate 91, the road light source 31A is located in the upper part thereof and the ceiling light source 32A is located in the lower part thereof.

The optical member 4A includes the plurality of road lenses 41 and the plurality of ceiling lenses 42. Each of the plurality of road lenses 41 is mounted on the substrate 3*b* of the light source module 310 to cover a corresponding one of the plurality of LED elements 3*a* included in the road light source 31A (refer to FIG. 2). Each of the road lenses 41 corresponds to a first optical member according to the present disclosure that causes the first bundle of rays L1 to emerge therefrom. Each of the plurality of ceiling lenses 42 is mounted on the substrate 3*d* of the light source module 320 to cover a corresponding one of the plurality of LED elements 3*c* included in the ceiling light source 32A (refer to FIG. 6). Each of the ceiling lenses 42 corresponds to a second optical member according to the present disclosure that causes the second bundle of rays L2 to emerge therefrom. In the first variation, the ceiling lenses 42 (second optical members) are located under the road lenses 41 (first optical members). This makes it easier to irradiate a region over the housing 2A with the second bundle of rays L2, thus allowing the inspection range to be expanded.

Also, the optical member 4A preferably causes the second bundle of rays L2 to emerge upward of the first bundle of rays L1 and the light quantity of the first bundle of rays L1 is preferably larger than that of the second bundle of rays L2.

Figure 15:
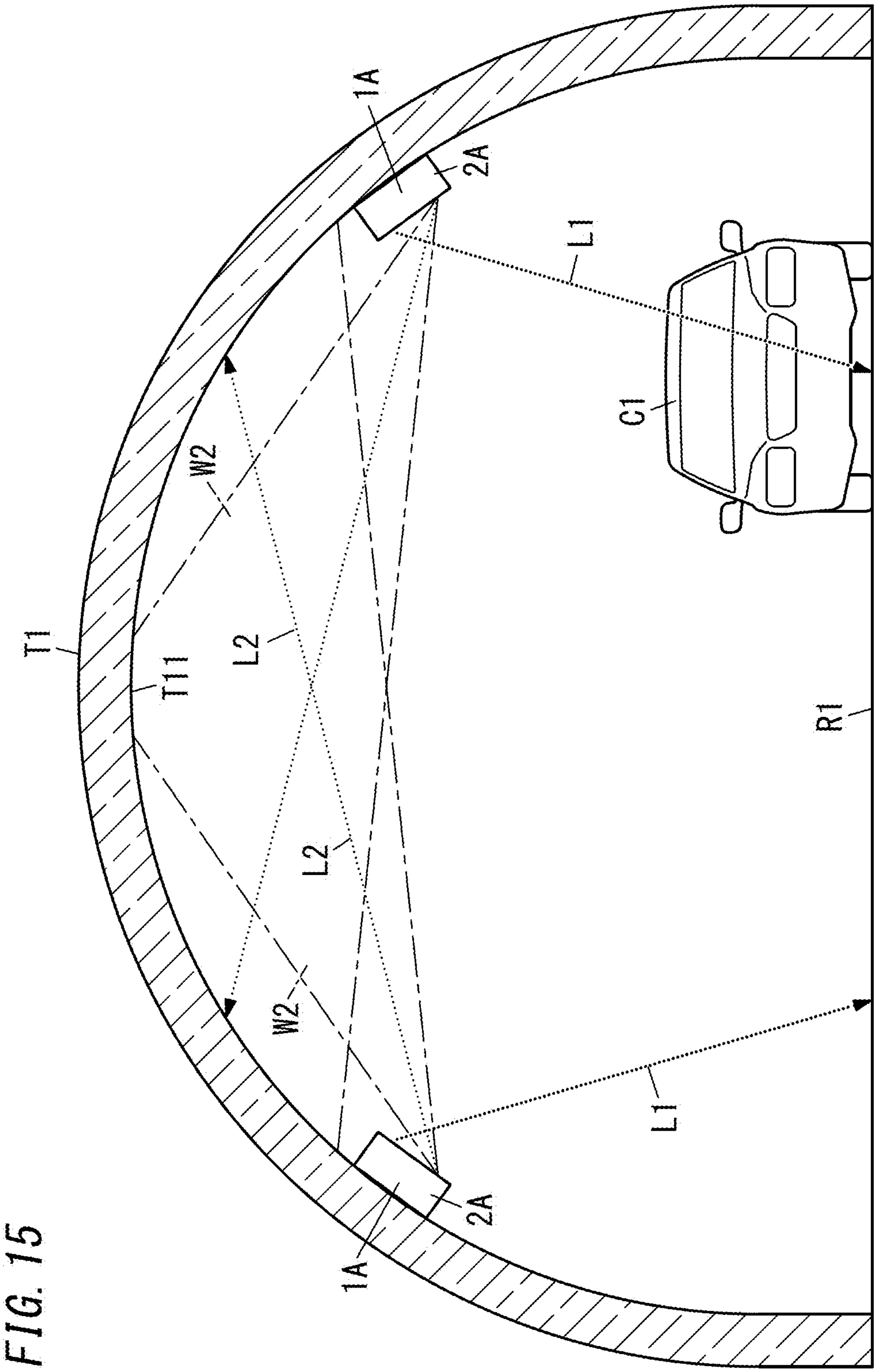
FIG. 15 illustrates the light distribution characteristics of the lighting fixture inside a tunnel.

Inside the housing 2A, the longitudinal axis of each of the road lenses 41 provided for the road light source 31A is aligned with the direction in which the left panel portion 23 and the right panel portion 24 face each other, and the latitudinal axis of each of the road lenses 41 is aligned with the direction in which the upper panel portion 25 and the lower panel portion 26 face each other. As shown in FIG. 15, when the housing 2A is mounted on the inner wall surface T11 of the tunnel T1, the window 2*a* of the housing 2A faces obliquely downward to cause the first bundle of rays L1 to travel mostly obliquely downward. As a result, the first bundle of rays L1 emerging from the surface of the road lenses 41 is mostly directed toward, and irradiate, the road R1 (refer to FIG. 15) through the window 2*a* of the housing 2A (refer to FIG. 14). Directing the first bundle of rays L1 toward the road R1 lights up the field of view of the driver who is driving the vehicle C1 along the road R1, thereby allowing the driver to drive his or her vehicle C1 more safely.

Inside the housing 2A, the longitudinal axis of each of the ceiling lenses 42 is aligned with the direction in which the left panel portion 23 and the right panel portion 24 face each other, and the latitudinal axis of each of the ceiling lenses 42 is aligned with the direction in which the upper panel portion 25 and the lower panel portion 26 face each other. As shown in FIG. 15, when the housing 2A is mounted on the inner wall surface T11 of the tunnel T1, the second bundle of rays L2 travels mostly upward because the ceiling lens 42 has such light distribution characteristics that cause more light to be distributed upward rather than downward. As a result, the second bundle of rays L2 emerging from the surface of the ceiling lenses 42 is transmitted through the window 2*a* of the housing 2A (refer to FIG. 14) to mostly irradiate upper parts of the inner wall surface T11 (refer to FIG. 15) of the tunnel T1. Specifically, the optical axis of the second bundle of rays L2 emitted from each lighting fixture 1A mounted on the inner wall surface T11 extends toward a corresponding one of the upper parts of the inner wall surface T11 that face each other with the road R1 interposed between themselves. Thus, the second bundle of rays L2 is transmitted through the window 2*a* (refer to FIG. 14) of each housing 2A to irradiate a corresponding one of the upper parts of the inner wall surface T11 that face each other with the road R1 interposed between themselves. The second bundle of rays L2 lights up the upper part of the inner wall surface T11 to ensure sufficient brightness for the inner wall surface T11.

The shooting unit 5 is disposed in the cutout 92 of the mounting plate 91 inside the housing 2A as shown in FIG. 14. The optical axis (shooting direction) of the shooting unit 5 is oriented through the window 2*b* of the housing 2A toward the inner wall surface T11 of the tunnel T1. The shooting range of the shooting unit 5 forms at least a part of the irradiation range of the second bundle of rays L2. The shooting unit 5 shoots the inner wall surface T11 irradiated with the second bundle of rays L2.

The lighting fixture 1A having such a configuration may shoot the inner wall surface T11 of the tunnel T1 easily.

(3) SECOND VARIATION

Figure 16:
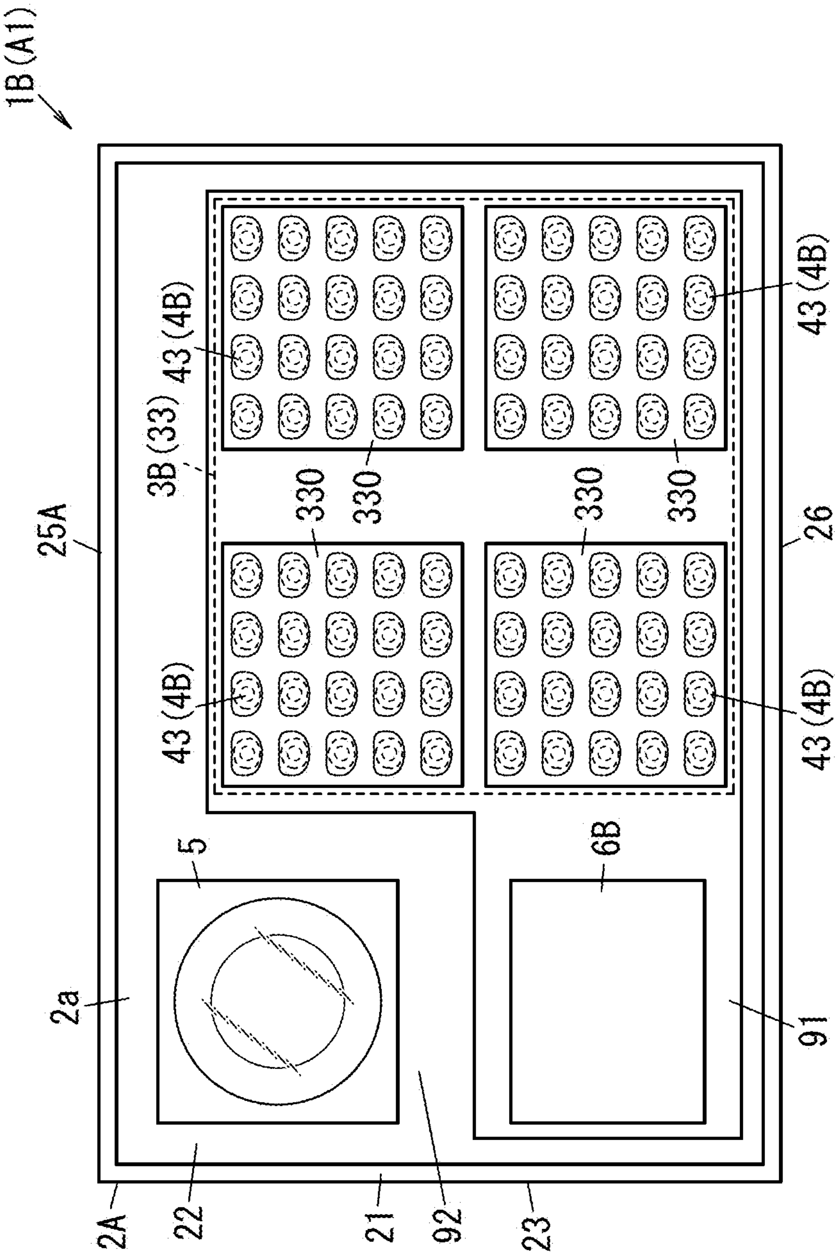
FIG. 16 is a front view illustrating a lighting fixture corresponding to a lighting system according to a second variation.

FIG. 16 illustrates a lighting fixture 1B according to a second variation.

The lighting fixture 1B includes the housing 2A, a light source 3B, an optical member 4B, and the shooting unit 5. In addition, the lighting fixture 1B further includes a circuit block 6B. In the following description, any constituent element of the lighting fixture 1B according to this second variation, having the same function as a counterpart of the lighting fixture 1A according to the first variation described above, will be designated by the same reference numeral as that counterpart's, and description thereof will be omitted herein.

In the second variation, the light source 3B includes a common light source 33.

The common light source 33 is made up of four light source modules 330 as shown in FIG. 16. The four light source modules 330 are arranged in a matrix pattern inside the housing 2A to face the front panel portion 21 of the housing 2A. The four light source modules 330 are arranged in a (2×2) matrix pattern on the front surface of the mounting plate 91 to be located on the right of the cutout 92.

Figure 17:
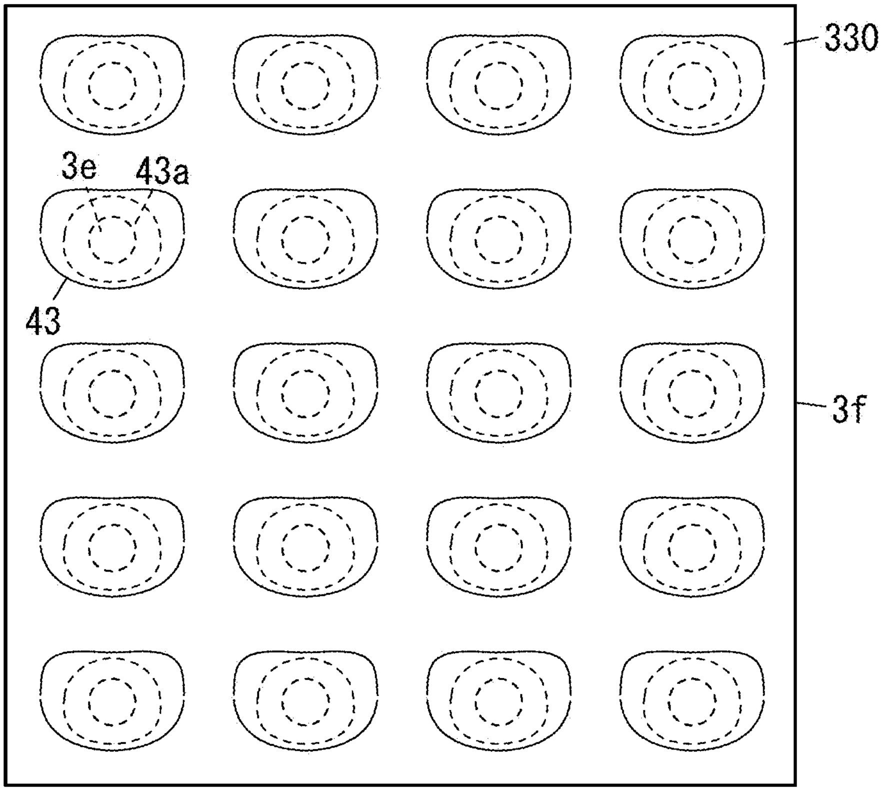
FIG. 17 is a plan view of a light source module forming part of a common light source included in the lighting fixture.

As shown in FIG. 17, each of the light source modules 330 includes a rectangular (e.g., square in the example shown in FIG. 17) substrate 3*f* and a plurality of LED elements 3*e* which are mounted on the substrate 3*f* to form a matrix pattern (e.g., to form a 5×4 matrix in FIG. 17). The light source module 330 is mounted on the front surface of the mounting plate 91 to have the LED elements 3*e* face the window 2*a* (refer to FIG. 16).

The optical member 4B is a set of lenses.

In the second variation, the optical member 4B includes a plurality of common lenses 43 as shown in FIG. 16. Each of the common lenses 43 causes both the first bundle of rays L1 and the second bundle of rays L2 to emerge therefrom. The optical member 4B preferably causes the second bundle of rays L2 to emerge upward of the first bundle of rays L1. The light quantity of the first bundle of rays L1 is preferably larger than that of the second bundle of rays L2.

Figure 18:
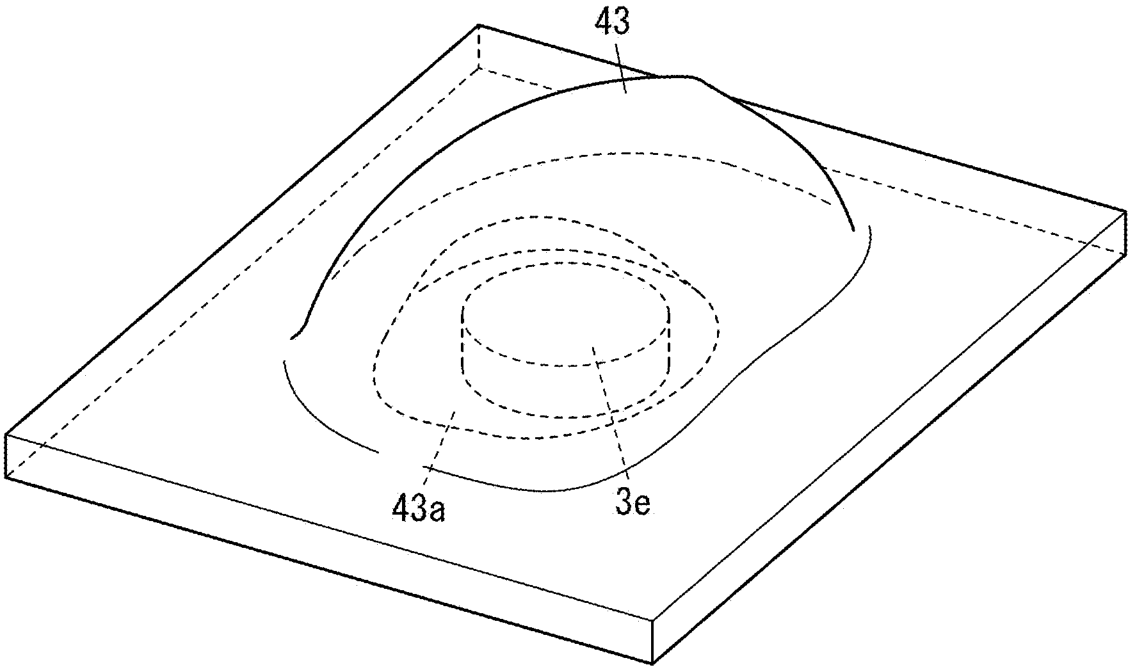
FIG. 18 is a perspective view of a common lens included in the lighting fixture.
Figure 19:
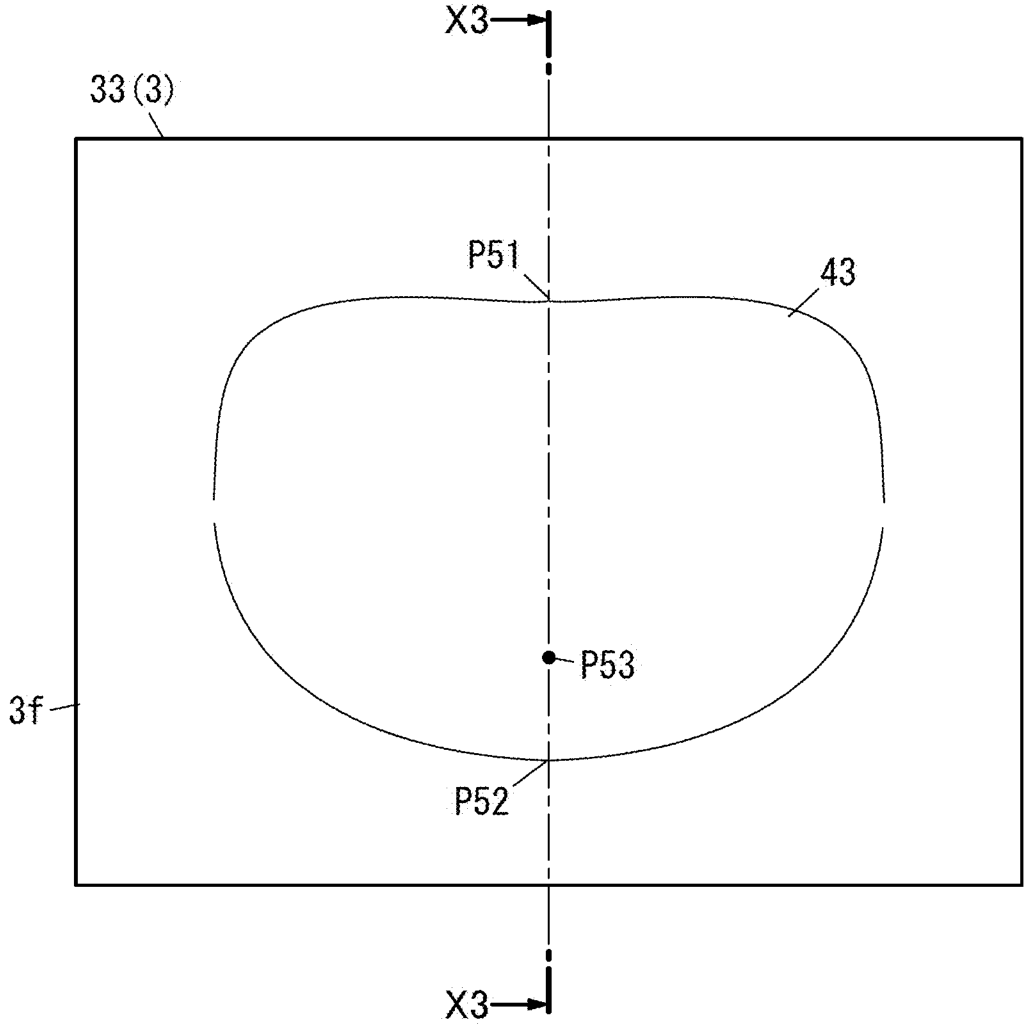
FIG. 19 is a plan view of the common lens included in the lighting fixture.

As shown in FIG. 17, each of the plurality of common lenses 43 is mounted on the substrate 3*f* to cover a corresponding one of the plurality of LED elements 3*e* included in the common light source 33. That is to say, the plurality of common lenses 43 correspond one to one to the plurality of LED elements 3*e* of the common light source 33. Each of the common lenses 43 has the shape of a compressed dome which is elongate in the rightward/leftward direction (i.e., the direction in which the left panel portion 23 and the right panel portion 24 face each other) as shown in FIGS. 18 and 19. The common lenses 43 each have a planar back surface in contact with the substrate 3*f*. The back surface has a recess 43*a* with the shape of a compressed dome. Each of the LED elements 3*e* mounted on the substrate 3*f* is housed inside the recess 43*a* of a corresponding one of the common lenses 43 mounted on the substrate 3*f*. Turning an LED element 3*e* ON inside the recess 43*a* causes the lighting light emitted from the LED element 3*e* to be incident on a corresponding one of the common lenses 43. Then, the lighting light emitted from the LED element 3*e* is transmitted through the common lens 43 to emerge from the surface of the common lens 43 as the first bundle of rays L1 and the second bundle of rays L2.

Figure 20:
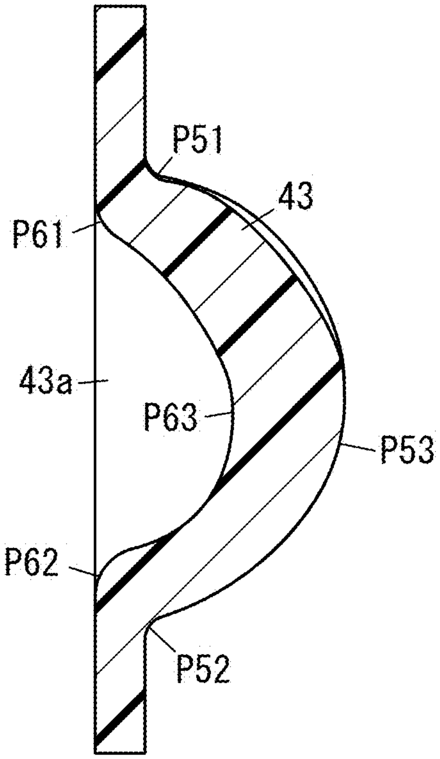
FIG. 20 is a cross-sectional view of the common lens included in the lighting fixture.

The surface shape of the common lens 43 is symmetric with respect to the longitudinal axis of the common lens 43 but asymmetric with respect to the latitudinal axis (which is perpendicular to the longitudinal axis) of the common lens 43. Likewise, the shape of the recess 43*a* is also symmetric with respect to the longitudinal axis of the common lens 43 but asymmetric with respect to the latitudinal axis of the common lens 43. FIG. 20 is a cross-sectional view of the common lens 43 taken along a plane X3-X3 (refer to FIG. 19), i.e., a plane aligned with the latitudinal axis of the common lens 43.

Both ends, facing each other in the latitudinal axis, of the surface of the common lens 43 will be hereinafter referred to as a "first end P51" and a "second end P52," respectively. In that case, the surface of the common lens 43 rises gently from the first end P51 to reach a peak P53 of the surface of the common lens 43 and then slopes steeply downward from the peak P53 to reach the second end P52. That is to say, the surface of the common lens 43 slopes more gently on one part thereof including the first end P51 than on the other part including the second end P52.

Both ends, facing each other in the latitudinal axis, of the recess 43*a* of the common lens 43 will be hereinafter referred to as a "first end P61" and a "second end P62," respectively. Along the latitudinal axis, the first end P61 of the recess 43*a* is located on the same side as the first end P51 of the surface of the common lens 43 and the second end P62 of the recess 43*a* is located on the same side as the second end P52 of the surface of the common lens 43. In that case, the surface of the recess 43*a* rises gently from the first end P61 to reach a peak P63 of the recess 43*a* and then slopes steeply downward from the peak P63 to reach the second end P62. That is to say, the recess 43*a* slopes more gently on one part thereof including the first end P61 than on the other part including the second end P62.

Furthermore, the surface of the common lens 43 is smoother than the surface (refer to FIG. 9) of the ceiling lens 42 and the peak P53 of the common lens 43 is more compressed than the peak P33 (refer to FIG. 9) of the ceiling lens 42. Furthermore, the inner surface of the recess 43*a* is smoother than the inner surface (refer to FIG. 5) of the recess 41*a* of the road lens 41 and the peak P63 of the recess 43*a* is more compressed than the peak P23 (refer to FIG. 5) of the recess 41*a* of the road lenses 41.

Inside the housing 2A, the longitudinal axis of each common lens 43 is aligned with the direction in which the left panel portion 23 and the right panel portion 24 face each other, and the latitudinal axis of the common lens 43 is aligned with the direction in which the upper panel portion 25 and the lower panel portion 26 face each other.

Figure 21:
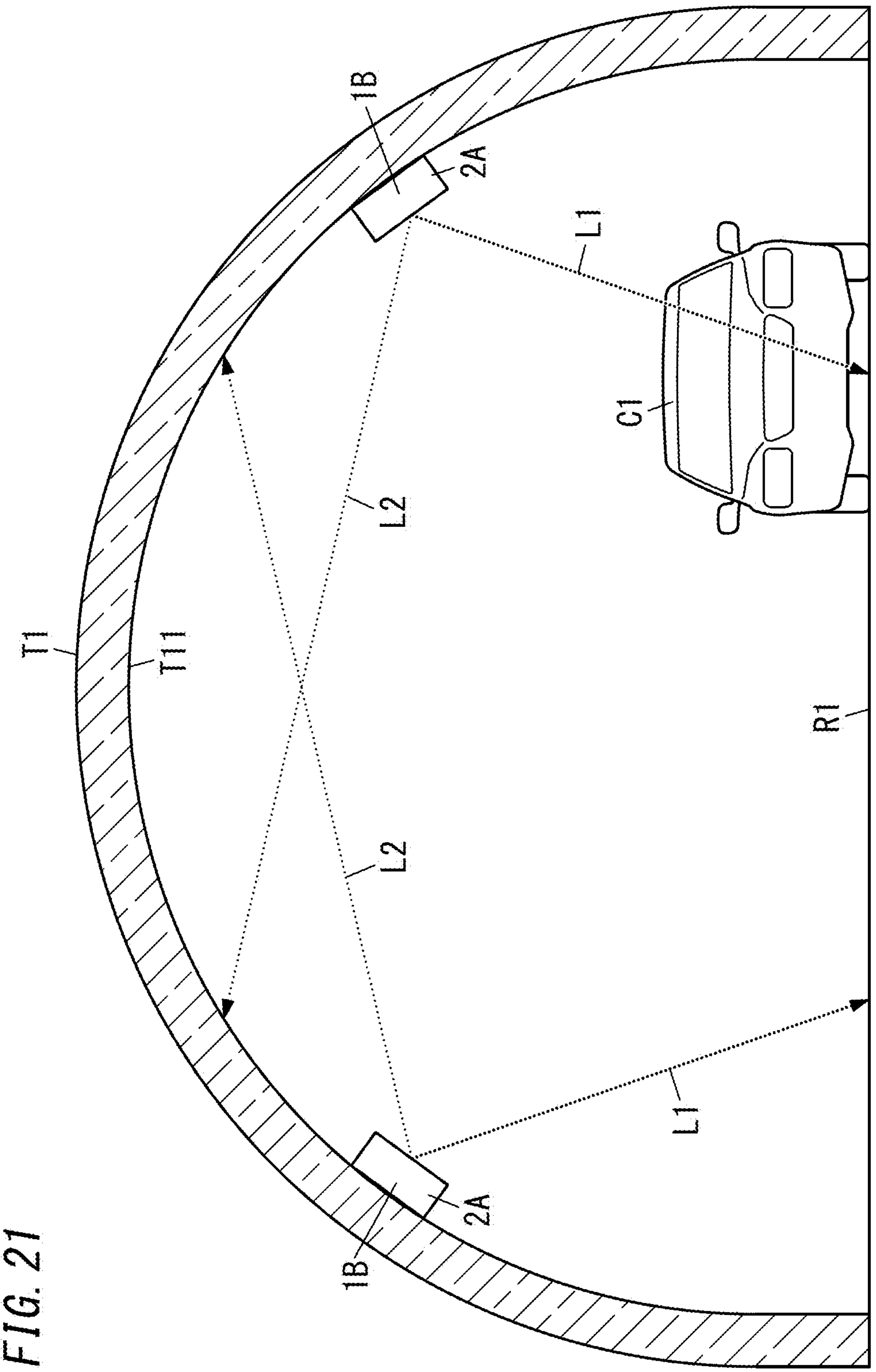
FIG. 21 illustrates the light distribution characteristics of the lighting fixture inside a tunnel.
Figure 22:
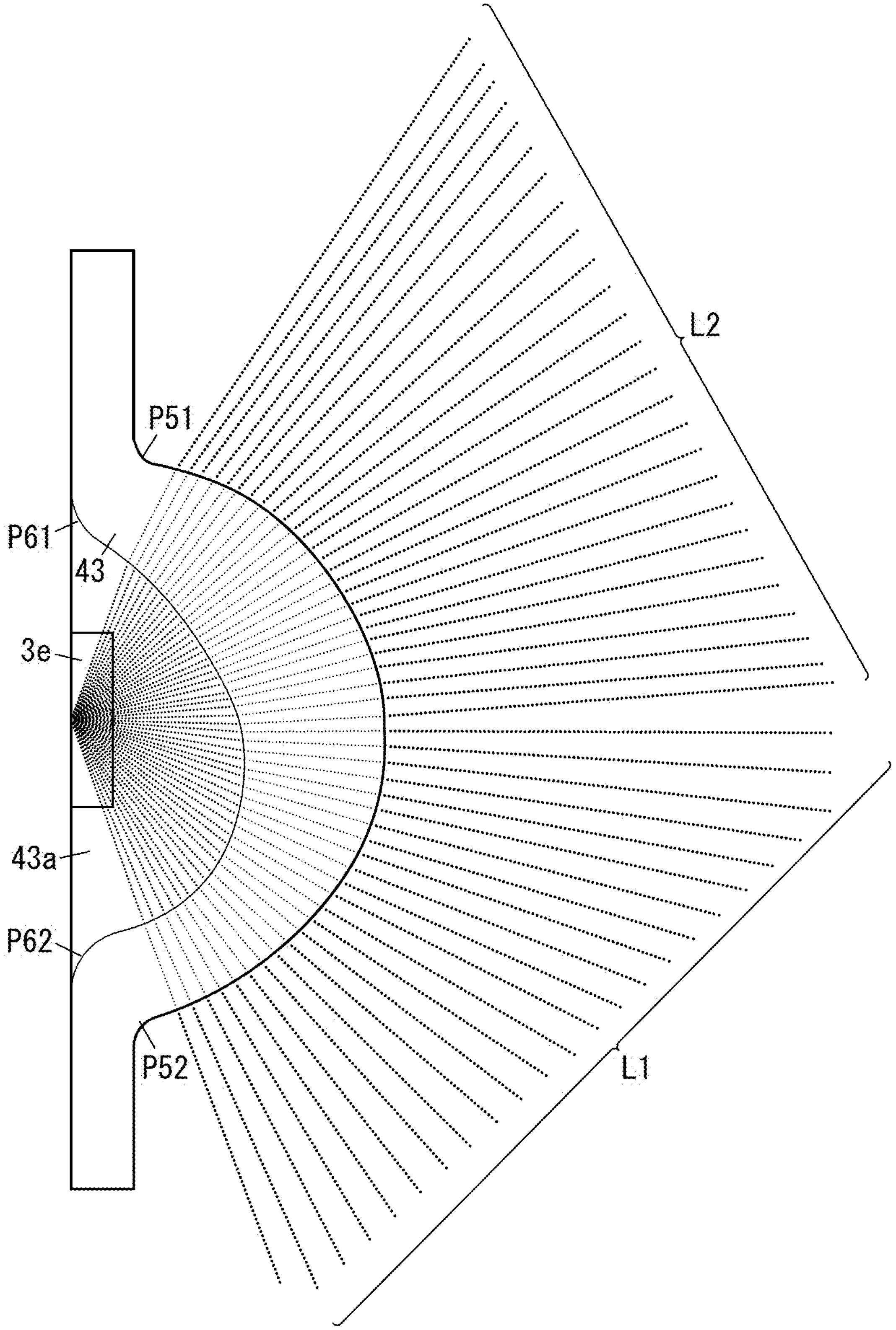
FIG. 22 shows the light distribution characteristics of a first bundle of rays and a second bundle of rays emerging from the common lens of the lighting fixture.

As shown in FIG. 21, when the housing 2A is mounted on the inner wall surface T11 of the tunnel T1, the first end P51 of the surface of each common lens 43 is located above the second end P52 thereof and the first end P61 of each recess 43*a* is located above the second end P62 thereof. The lighting light emitted from each LED element 3*e* inside the recess 43*a* is transmitted through the common lens 43 to emerge as the first bundle of rays L1 and the second bundle of rays L2 shown in FIG. 22 from the surface of the common lens 43. The first bundle of rays L1 emerges from a lower part of the surface of the common lens 43 to travel downward. The second bundle of rays L2 emerges from an upper part of the surface of the common lens 43 to travel upward.

As a result, the first bundle of rays L1 is transmitted through the window 2*a* of the housing 2A (refer to FIG. 16) to mostly irradiate the road R1 (refer to FIG. 21). Directing the first bundle of rays L1 toward the road R1 lights up the field of view of the driver who is driving the vehicle C1 along the road R1, thereby allowing the driver to drive his or her vehicle C1 more safely.

The second bundle of rays L2 is transmitted through the window 2*a* of the housing 2A (refer to FIG. 16) to mostly irradiate an upper part of the inner wall surface T11 (refer to FIG. 21) of the tunnel T1. Specifically, the optical axis of the second bundle of rays L2 emitted from each lighting fixture 1B mounted on the inner wall surface T11 extends toward a corresponding one of the upper parts of the inner wall surface T11 that face each other with the road R1 interposed between themselves. Thus, the second bundle of rays L2 is transmitted through the window 2*a* (refer to FIG. 16) of each housing 2A to irradiate a corresponding one of the upper parts of the inner wall surface T11 that face each other with the road R1 interposed between themselves. The second bundle of rays L2 lights up the upper part of the inner wall surface T11 to ensure sufficient brightness for the inner wall surface T11.

The lighting fixture 1B having such a configuration may shoot the inner wall surface T11 of the tunnel T1 easily.

Figure 23:
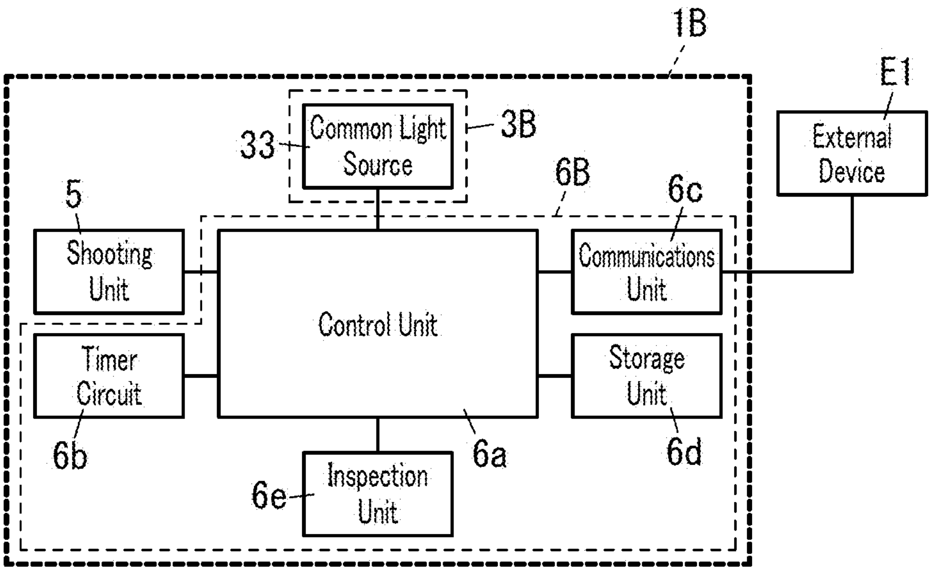
FIG. 23 is a block diagram showing a configuration for the lighting fixture.

In addition, in the circuit block 6B, the control unit 6*a* selectively turns ON and OFF the common light source 33, thereby selectively radiating the first bundle of rays L1 and the second bundle of rays L2 synchronously with each other as shown in FIG. 23.

(4) THIRD VARIATION

Figure 24:
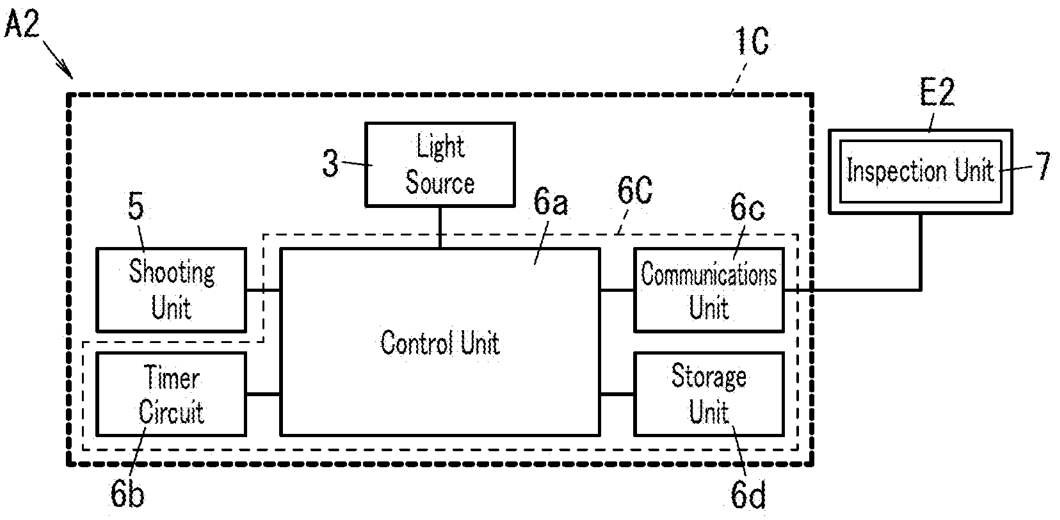
FIG. 24 is a block diagram showing a configuration for a lighting system according to a third variation.

In a third variation, a lighting fixture 1C and an external device E2 form a lighting system A2 as shown in FIG. 24. In the lighting system A2, the lighting fixture 1C includes a circuit block 6C. The circuit block 6C does not include the inspection unit 6*e*. Instead, the external device E2 includes an inspection unit 7. In the following description, any constituent element of this third variation, having the same function as a counterpart of the embodiment and the first and second variations described above, will be designated by the same reference numeral as that counterpart's, and description thereof will be omitted herein.

In this lighting fixture 1C, the storage unit 6*d* stores address information for use to transmit, to the external device E2, data about the captured image generated by having the inner wall surface T11 shot by the shooting unit 5. Then, the communications unit 6*c* reads out the address information of the external device E2 from the storage unit 6*d* and transmits the data about the captured image to the external device E2 using the address information of the external device E2. That is to say, the control unit 6*a* instructs the communications unit 6*c* to transmit, to the external device E2, data about the captured image generated by having the inner wall surface T11 shot by the shooting unit 5.

In the external device E2, the inspection unit 7 has the same inspection capability as that of the inspection unit 6*e* and inspects the inner wall surface T11 based on the captured image of the inner wall surface T11. The inspection unit 7 subjects the captured image of the inner wall surface T11 to image recognition processing, thereby determining whether or not the inner wall surface T11 has any imperfections such as ruggedness, fractures, or flaking.

The external device E2 visually and auditorily presents the result of inspection to an inspector who is engaged in the services of an inspection organization. Then, in accordance with the result of inspection presented, the inspector takes preparatory steps to make repair and maintenance of the inner wall surface T11 of the tunnel T1.

Alternatively, the external device E2 may transmit data about the result of inspection to the lighting fixture 1C. In the lighting fixture 1C, the communications unit 6*c* receives the data about the result of inspection from the lighting fixture 1C. That is to say, the communications unit 6*c* receives, from the external device E2, data about the result of inspection of the inner wall surface T11 based on the captured image. The control unit 6*a* sets the timing for the shooting unit 5 to perform shooting based on the result of inspection. For example, if any imperfections are found on the inner wall surface T11, the control unit 6*a* increases the frequency of shooting for the shooting unit 5 to perform the inspection more frequently.

Optionally, according to an implementation, an information collecting center, for example, may perform remote control on the spot inside the tunnel T1. In that case, the inspection unit 7 is preferably able to perform remote control on the shooting range (i.e., the angle of view) of the shooting unit 5 (e.g., to change the angle of view from a wide angle into a narrow angle, or vice versa) in accordance with the specifics of the remote control instructed by the information collecting center, for example. Furthermore, if the shooting unit 5 is configured to be able to pan (both horizontally and to the right and left), tilt (both vertically and up and down), and roll (or rotate), then the inspection unit 7 is preferably able to adjust the shooting direction by controlling the respective movements (including pan, tilt, and roll) of the shooting unit 5.

Furthermore, the lighting fixture 1C is preferably configured to be able to adjust the irradiation range and irradiation direction of the second bundle of rays L2 in conformity with the shooting range and shooting direction of the shooting unit 5. In that case, the lighting fixture 1C includes a constituent element such as a drive system or a variable optical system for adjusting the irradiation range and irradiation direction of the second bundle of rays L2.

(5) FOURTH VARIATION

Figure 25:
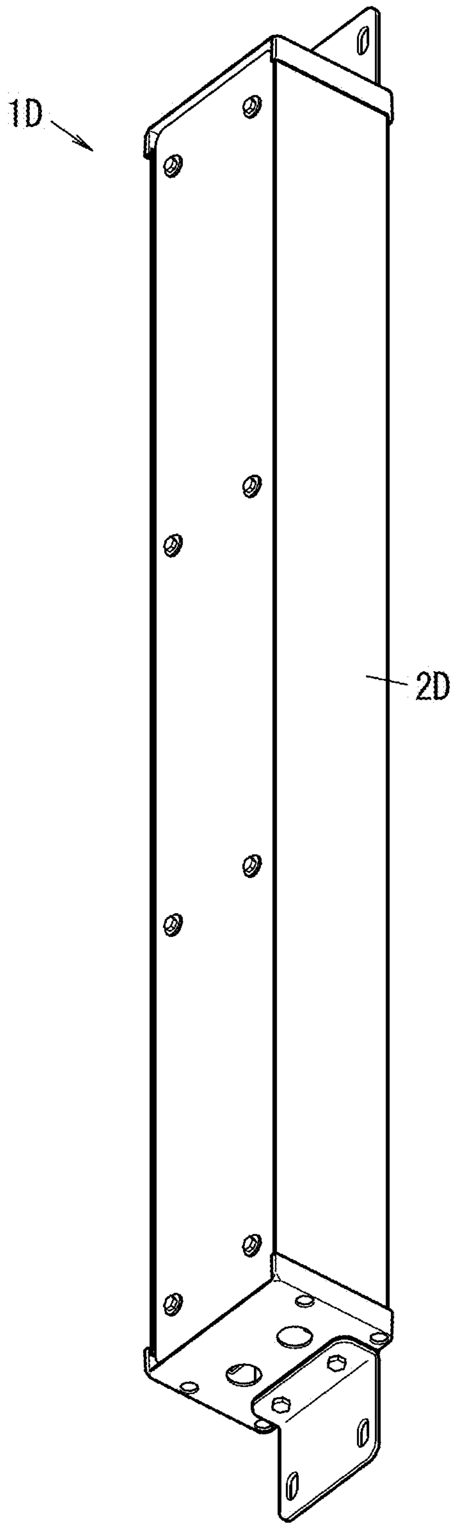
FIG. 25 is a perspective view of a lighting fixture according to a fourth variation.
Figure 26:
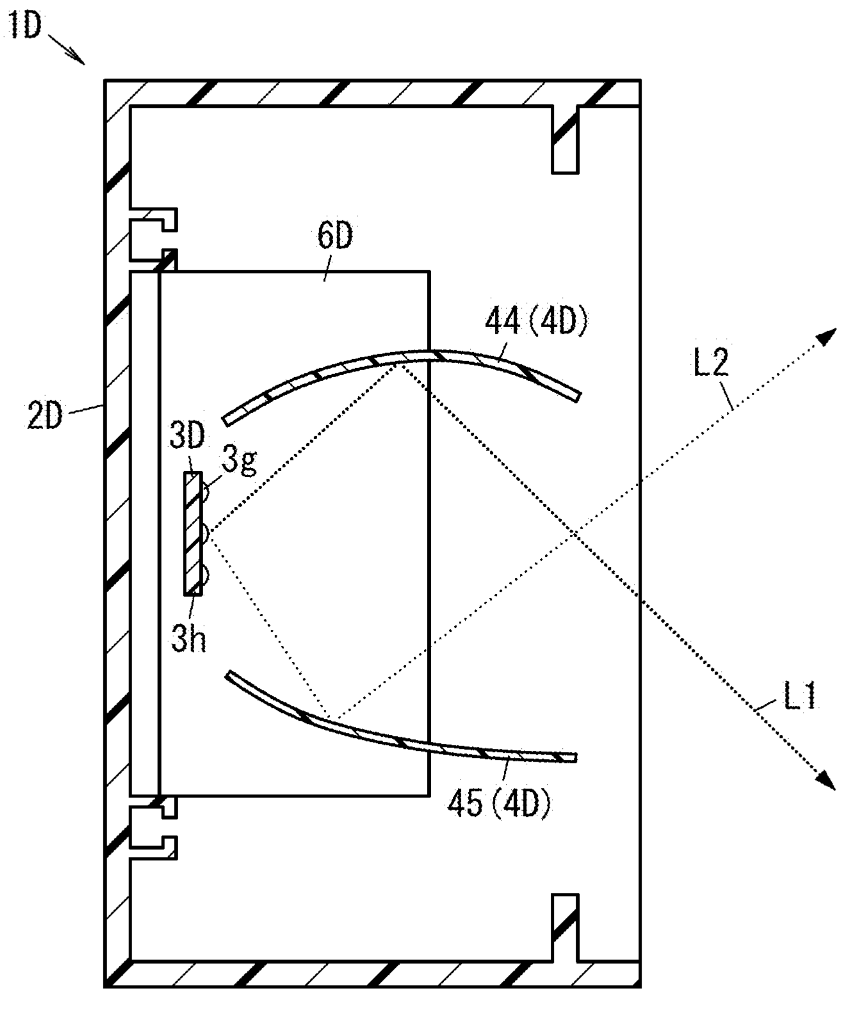
FIG. 26 is a cross-sectional view of the lighting fixture.

FIGS. 25 and 26 illustrate a lighting fixture 1D according to a fourth variation.

The lighting fixture 1D includes a housing 2D having the shape of an elongate rectangular parallelepiped box (refer to FIG. 25). Inside the housing 2D, housed are a light source 3D, an optical member 4D, the shooting unit 5, and a circuit block 6D (refer to FIG. 26). The optical member 4D is a reflector. Note that illustration of the shooting unit 5 is omitted from FIG. 26.

The light source 3D includes a plurality of LED elements 3*g* and a substrate 3*h*. The substrate 3*h* has the shape of an elongate plate and is housed inside the housing 2D. The plurality of LED elements 3*g* are mounted in a matrix pattern on the substrate 3*h*.

The optical member 4D includes a road reflector 44 and a ceiling reflector 45. The road reflector 44 is disposed above the light source 3D and has an elongate shape to extend along the longitudinal axis of the light source 3D. The road reflector 44 reflects downward the lighting light emitted from the light source 3D to cause the first bundle of rays L1 emerge from the lighting fixture 1D. That is to say, the road reflector 44 corresponds to a first optical member that causes the first bundle of rays L1 to emerge therefrom. The ceiling reflector 45 is disposed below the light source 3D and has an elongate shape to extend along the longitudinal axis of the light source 3D. The ceiling reflector 45 reflects upward the lighting light emitted from the light source 3D to cause the second bundle of rays L2 emerge from the lighting fixture 1D. That is to say, the ceiling reflector 45 corresponds to a second optical member that causes the second bundle of rays L2 to emerge therefrom.

(6) FIFTH VARIATION

The lighting fixtures 1, 1A, 1B, 1C, 1D are each preferably configured to be able to adjust the optical axes (i.e., emerging directions) of the first bundle of rays L1 and the second bundle of rays L2. For example, the lighting fixtures 1, 1A, 1B, 1C, 1D may each include an optical axis adjusting means configured to be able to adjust the installation angle of the light source module 310, 320, 330 or the light source 3D. In that case, the emerging directions of the first bundle of rays L1 and the second bundle of rays L2 may be adjusted according to the structure of the actual tunnel T1. In addition, this also allows a properly operating light source module 310, 320, 330 to be used instead of a light source module 310, 320, 330 that has gone out of order. For example, if a light source module 320 has gone out of order, one of the plurality of light source modules 310 may be used instead of the light source module 320 that has gone out of order by adjusting the installation angle of the light source module 310.

The shooting unit 5 is preferably configured to make its shooting direction adjustable. For example, to shoot the entire irradiation range W2 of the second bundle of rays L2, the shooting unit 5 shoots the entire irradiation range W2 while changing the shooting direction. This allows the inspection unit 6*e*, 7 to inspect a broader range of the inner wall surface T11.

The shooting unit 5 may be provided separately from the housing 2, 2A, 2D outside of the housing 2, 2A, 2D.

The circuit block 6, 6B, 6C, 6D may be implemented as either a single computer system or a plurality of computer systems which are interlinked with each other, whichever is appropriate. Alternatively, the circuit block 6, 6B, 6C, 6D may also be implemented as a cloud computing system.

The plurality of lighting fixtures 1, 1A, 1B, 1C, 1D are arranged side by side along the road R1 inside the tunnel T1. However, this is only an example and should not be construed as limiting. Rather, the number of the lighting fixtures 1, 1A, 1B, 1C, 1D installed inside the tunnel T1 only needs to be at least one.

Note that the constituent elements of the exemplary embodiment and its variations may be adopted in combination as appropriate.

(7) RECAPITULATION

A lighting system (A1; A2) according to a first aspect of the exemplary embodiment described above includes a housing (2; 2A; 2D), a light source (3; 3A; 3B; 3D), an optical member (4; 4A; 4B; 4D), and a shooting unit (5). The housing (2; 2A; 2D) is mounted on an inner wall surface (T11) of a tunnel (T1) provided along a road (R1). The light source (3; 3A; 3B; 3D) is provided for the housing (2; 2A; 2D) to emit lighting light. The optical member (4; 4A; 4B; 4D) is provided for the housing (2; 2A; 2D) to receive the lighting light incident thereon. The shooting unit (5) is provided for the housing (2; 2A; 2D). The optical member (4; 4A; 4B; 4D) causes a first bundle of rays (L1) to emerge toward the road (R1) and also causes a second bundle of rays (L2) to emerge toward the inner wall surface (T11). The shooting unit (5) shoots at least a part of an irradiation range (W2) where the inner wall surface (T11) is irradiated with the second bundle of rays (L2).

This lighting system (A1; A2) makes it easier to shoot the inner wall surface (T11) of a tunnel (T1).

In a lighting system (A1; A2) according to a second aspect of the exemplary embodiment, which may be implemented in conjunction with the first aspect, the optical member (4; 4A; 4B; 4D) preferably includes at least: a first optical member (41; 44) that causes the first bundle of rays (L1) to emerge therefrom; and a second optical member (42; 45) that causes the second bundle of rays (L2) to emerge therefrom.

This lighting system (A1; A2) divides the optical member (4; 4A; 4B; 4D) into a first optical member (41; 44) for lighting up the road (R1) and a second optical member (42; 45) for lighting up the inner wall surface (T11). This allows the lighting system (A1; A2) to reduce causing glare.

In a lighting system (A1; A2) according to a third aspect of the exemplary embodiment, which may be implemented in conjunction with the second aspect, the second optical member (42; 45) is preferably located under the first optical member (41; 44).

This lighting system (A1; A2) makes it easier to irradiate a region above the housing (2; 2A; 2D) with the second bundle of rays (L2), thus allowing the inspection range to be expanded.

In a lighting system (A1; A2) according to a fourth aspect of the exemplary embodiment, which may be implemented in conjunction with any one of the first to third aspects, the housing (2) includes a pair of panel portions (25, 26) facing each other in an upward/downward direction. The pair of panel portions (25, 26) consists of an upper panel portion (25) and a lower panel portion (26). The upper panel portion (25) is located over the lower panel portion (26). The optical member (4) preferably causes the second bundle of rays (L2) to emerge from the upper panel portion (25) and travel along the inner wall surface (T11).

This lighting system (A1; A2) allows the second bundle of rays (L2) to emerge from the upper panel portion (25) and travel along the inner wall surface (T11). Consequently, this allows various imperfections, such as ruggedness, fractures, and flaking, of the inner wall surface (T11) to be highlighted with the second bundle of rays (L2) within the irradiation range of the second bundle of rays (L2), thus making the conditions (such as the presence or absence of any imperfections) of the inner wall surface (T11) easily recognizable either optically or visually.

In a lighting system (A1; A2) according to a fifth aspect of the exemplary embodiment, which may be implemented in conjunction with any one of the first to fourth aspects, the optical member (4; 4A; 4B; 4D) is preferably either a lens or a reflector.

This lighting system (A1; A2) realizes desired light distribution characteristics easily.

In a lighting system (A1; A2) according to a sixth aspect of the exemplary embodiment, which may be implemented in conjunction with the second or third aspect, the first optical member (41; 44) is preferably either a lens or a reflector, and the second optical member (42; 45) is preferably either a lens or a reflector.

This lighting system (A1; A2) realizes desired light distribution characteristics easily.

In a lighting system (A1; A2) according to a seventh aspect of the exemplary embodiment, which may be implemented in conjunction with any one of the first to sixth aspects, the optical member (4; 4A; 4B; 4D) preferably causes the second bundle of rays (L2) to emerge upward of the first bundle of rays (L1). The light quantity of the first bundle of rays (L1) is preferably larger than the light quantity of the second bundle of rays (L2).

This lighting system (A1; A2) allows the first bundle of rays (L1) to be used as a main light for lighting up the road and the second bundle of rays (L2) to be used as an auxiliary light for inspection purposes.

A lighting system (A1; A2) according to an eighth aspect of the exemplary embodiment, which may be implemented in conjunction with any one of the first to seventh aspects, preferably further includes a timer circuit (6*b*) that records time. The data about the captured image includes data about the time indicating when the captured image was generated.

This lighting system (A1; A2) allows the captured image to be associated with the time when the captured image was generated.

In a lighting system (A1; A2) according to a ninth aspect of the exemplary embodiment, which may be implemented in conjunction with any one of the first to eighth aspects, the first bundle of rays (L1) and the second bundle of rays (L2) are preferably caused to emerge simultaneously.

This lighting system (A1; A2) allows the road to be lit up continuously even during the inspection and may also keep the internal space of the tunnel (T1) visually recognizable even during the inspection.

A lighting system (A1; A2) according to a tenth aspect of the exemplary embodiment, which may be implemented in conjunction with any one of the first to ninth aspects, preferably further includes an inspection unit (6*e*; 7) that inspects the inner wall surface (T11) based on the captured image.

This lighting system (A1; A2) has not only the capability of shooting the inner wall surface (T11) but also the capability of inspecting the inner wall surface (T11) based on the captured image, thus allowing for getting the work done by using only this lighting system (A1; A2) from shooting of the inner wall surface (T11) through the inspection thereof.

In a lighting system (A1) according to an eleventh aspect of the exemplary embodiment, which may be implemented in conjunction with the tenth aspect, the inspection unit (6*e*) is preferably provided for the housing (2; 2A; 2D).

This lighting system (A1) allows for getting the work done from shooting of the inner wall surface (T11) through the inspection thereof just by installing a lighting fixture (1; 1A; 1B; 1D) inside the tunnel (T1), thus improving the handiness.

A lighting system (A1; A2) according to a twelfth aspect of the exemplary embodiment, which may be implemented in conjunction with any one of the first to eleventh aspects, preferably further includes a communications unit (6*c*) that communicates with an external device (E1; E2).

This lighting system (A1; A2) allows various pieces of information to be acquired from the external device (E1; E2) and also allows various types of data to be saved in the external device (E1; E2).

In a lighting system (A1; A2) according to a thirteenth aspect of the exemplary embodiment, which may be implemented in conjunction with the twelfth aspect, the shooting unit (5) preferably performs a shooting operation when the communications unit (6*c*) receives a shooting request.

This lighting system (A1; A2) may set, by remote control, the timing for the shooting unit (5) to perform shooting.

In a lighting system (A2) according to a fourteenth aspect of the exemplary embodiment, which may be implemented in conjunction with the twelfth or thirteenth aspect, the external device (E2) is preferably managed by an organization that inspects the inner wall surface (T11) based on the captured image generated by the shooting unit (5). The communications unit (6*c*) preferably transmits the data about the captured image to the external device (E2).

This lighting system (A2) allows the inspection of the inner wall surface (T11) based on the captured image to be conducted by outsourcing.

A lighting system (A2) according to a fifteenth aspect of the exemplary embodiment, which may be implemented in conjunction with any one of the twelfth to fourteenth aspects, preferably further includes a storage unit (6*d*) that stores address information for use to transmit the data about the captured image to the external device (E2).

This lighting system (A2) allows the inspection of the inner wall surface (T11) based on the captured image to be conducted by outsourcing.

In a lighting system (A2) according to a sixteenth aspect of the exemplary embodiment, which may be implemented in conjunction with any one of the twelfth to fifteenth aspects, the communications unit (6*c*) preferably receives, from the external device (E2), data about a result of inspection of the inner wall surface (T11) based on the captured image.

This lighting system (A2) allows the inspection of the inner wall surface (T11) based on the captured image to be conducted by outsourcing.

A lighting system (A2) according to a seventeenth aspect of the exemplary embodiment, which may be implemented in conjunction with any one of the twelfth to sixteenth aspects, preferably further includes an inspection unit (6*e*) that inspects the inner wall surface (T11) based on the captured image. The communications unit (6*c*) transmits, to the external device (E1), a repair request in accordance with a result of inspection made by the inspection unit (6*e*). The repair request is a request for repairing the inner wall surface (T11).

This lighting system (A2) may send a request for the repair and maintenance of the inner wall surface (T11) quickly.

In a lighting system (A1; A2) according to an eighteenth aspect of the exemplary embodiment, which may be implemented in conjunction with any one of the twelfth to seventeenth aspects, the communications unit (6*c*) preferably receives weather information about weather in an area where the tunnel (T1) is located. The frequency of shooting for the shooting unit (5) is preferably set in accordance with the weather information.

This lighting system (A1; A2) contributes to conducting the inspection more accurately even in bad weather or on the outbreak of disaster.

REFERENCE SIGNS LIST

A1, A2 Lighting System
1, 1A, 1B, 1D Lighting Fixture (Lighting System)
2, 2A, 2D Housing
25 Upper Panel Portion (Panel Portion)
26 Lower Panel Portion (Panel Portion)
3, 3A, 3B, 3D Light Source
4, 4A, 4B, 4D Optical Member
41 Road Lens (First Optical Member)
42 Ceiling Lens (Second Optical Member)
44 Road Reflector (First Optical Member)
45 Ceiling Reflector (Second Optical Member)
5 Shooting Unit
6*b* Timer Circuit
6*c* Communications Unit
6*d* Storage Unit
6*e* Inspection Unit
7 Inspection Unit
R1 Road
T1 Tunnel
T11 Inner Wall Surface
L1 First Bundle of rays
L2 Second Bundle of rays
W2 Irradiation Range
E1, E2 External Device

The invention claimed is:

1. A lighting system comprising:
a housing mounted on an inner wall surface of a tunnel provided along a road;
a light source provided for the housing and configured to emit lighting light;
an optical member provided for the housing and configured to receive the lighting light incident thereon; and
a shooting unit provided for the housing,
the optical member being configured to cause a first bundle of rays to emerge toward the road and also cause a second bundle of rays to emerge toward the inner wall surface, and
the shooting unit being configured to generate data about a captured image for inspection of the inner wall surface by shooting at least part of an irradiation range where the inner wall surface is irradiated with the second bundle of rays.

2. The lighting system of claim 1, wherein
the optical member includes at least:
a first optical member configured to cause the first bundle of rays to emerge therefrom; and
a second optical member configured to cause the second bundle of rays to emerge therefrom.

3. The lighting system of claim 2, wherein
the second optical member is located under the first optical member.

4. The lighting system of claim 1, wherein
the housing includes a pair of panel portions facing each other in an upward/downward direction, the pair of panel portions consisting of an upper panel portion and a lower panel portion, the upper panel portion being located over the lower panel portion, and
the optical member is configured to cause the second bundle of rays to emerge from the upper panel portion and travel along the inner wall surface.

5. The lighting system of claim 1, wherein
the optical member is either a lens or a reflector.

6. The lighting system of claim 2, wherein
the first optical member is either a lens or a reflector, and the second optical member is either a lens or a reflector.

7. The lighting system of claim 1, wherein
the optical member is configured to cause the second bundle of rays to emerge upward of the first bundle of rays, and
a light quantity of the first bundle of rays is larger than a light quantity of the second bundle of rays.

8. The lighting system of claim 1, further comprising a timer circuit configured to record time, wherein
the data about the captured image includes data about the time indicating when the captured image was generated.

9. The lighting system of claim 1, wherein
the first bundle of rays and the second bundle of rays are caused to emerge simultaneously.

10. The lighting system of claim 1, further comprising an inspection unit configured to inspect the inner wall surface based on the captured image.

11. The lighting system of claim 10, wherein
the inspection unit is provided for the housing.

12. The lighting system of claim 1, further comprising a communications unit configured to communicate with an external device.

13. The lighting system of claim 12, wherein
the shooting unit is configured to perform a shooting operation when the communications unit receives a shooting request.

14. The lighting system of claim 12, wherein the external device is managed by an organization configured to inspect the inner wall surface based on the captured image generated by the shooting unit, and the communications unit is configured to transmit the data about the captured image to the external device.

15. The lighting system of claim 14, further comprising a storage unit configured to store address information for use to transmit the data about the captured image to the external device.

16. The lighting system of claim 14, wherein the communications unit is configured to receive, from the external device, data about a result of the inspection of the inner wall surface based on the captured image.

17. The lighting system of claim 12, further comprising an inspection unit configured to inspect the inner wall surface based on the captured image, wherein the communications unit is configured to transmit, to the external device, a repair request in accordance with a result of the inspection made by the inspection unit, the repair request being a request for repairing the inner wall surface.

18. The lighting system of claim 12, wherein the communications unit is configured to receive weather information about weather in an area where the tunnel is located, and a frequency of shooting for the shooting unit is set in accordance with the weather information.

* * * * *